US012090998B2

(12) United States Patent
Shimizu et al.

(10) Patent No.: US 12,090,998 B2
(45) Date of Patent: Sep. 17, 2024

(54) VEHICLE CONTROL APPARATUS

(71) Applicant: TOYOTA JIDOSHA KABUSHIKI KAISHA, Toyota (JP)

(72) Inventors: Kenichi Shimizu, Susono (JP); Arifumi Matsumoto, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 17/572,856

(22) Filed: Jan. 11, 2022

(65) Prior Publication Data

US 2022/0227359 A1   Jul. 21, 2022

(30) Foreign Application Priority Data

Jan. 21, 2021 (JP) ................................. 2021-008040

(51) Int. Cl.
*B60W 30/09* (2012.01)
*B60W 30/18* (2012.01)

(52) U.S. Cl.
CPC ...... *B60W 30/09* (2013.01); *B60W 30/18159* (2020.02); *B60W 2520/10* (2013.01); *B60W 2520/105* (2013.01); *B60W 2520/12* (2013.01); *B60W 2520/125* (2013.01); *B60W 2554/4041* (2020.02); *B60W 2554/4044* (2020.02)

(58) Field of Classification Search
CPC .......... B60W 30/09; B60W 30/18159; B60W 2554/4041; B60W 2554/4044; B60W 2520/10; B60W 2520/105; B60W 2520/12; B60W 2520/125

USPC ........................................................ 701/29.1
See application file for complete search history.

(56) References Cited

U.S. PATENT DOCUMENTS

| 9,751,506 | B2 | 9/2017 | Mudalige et al. | |
|---|---|---|---|---|
| 2010/0091513 | A1* | 4/2010 | Kamioka | G06V 20/584 348/148 |
| 2017/0018177 | A1 | 1/2017 | Kurotobi et al. | |
| 2017/0305418 | A1 | 10/2017 | Bae | |
| 2018/0137760 | A1 | 5/2018 | Kobayashi et al. | |
| 2018/0268702 | A1 | 9/2018 | Morotomi et al. | |
| 2018/0339714 | A1* | 11/2018 | Smid | B60W 50/14 |
| 2018/0357903 | A1* | 12/2018 | Fukunaga | G08G 1/166 |

(Continued)

FOREIGN PATENT DOCUMENTS

| EP | 3 725 628 A1 | 10/2020 |
|---|---|---|
| EP | 3 725 629 A1 | 10/2020 |

(Continued)

*Primary Examiner* — Mahmoud S Ismail

(74) *Attorney, Agent, or Firm* — Sughrue Mion, PLLC

(57) ABSTRACT

A vehicle control apparatus selects at least one oncoming vehicle and sets the selected oncoming vehicle as a control target vehicle when an own vehicle turns right or left in a traffic intersection, acquires a first index value which represents a collision probability, and executes a collision avoiding control when the first index value satisfies a predetermined condition. The vehicle control apparatus calculates a second index value which represents a degree of turning of the own vehicle, moves an area used to select the control target vehicle toward the own vehicle in an opposite direction to a turning direction of the own vehicle as the second index value increases, and selects, as the control target vehicle, the oncoming vehicle which has been in the area for a predetermined time threshold or more.

6 Claims, 19 Drawing Sheets

(56) References Cited

U.S. PATENT DOCUMENTS

| | | |
|---|---|---|
| 2019/0291729 A1 | 9/2019 | Kamiya et al. |
| 2020/0139944 A1 | 5/2020 | Kamiya et al. |
| 2020/0331468 A1* | 10/2020 | Ohmura ................. G06V 20/58 |
| 2021/0300243 A1 | 9/2021 | Shimuzu et al. |
| 2023/0237911 A1* | 7/2023 | Hoashi ................... G08G 1/167 |
| | | 701/301 |
| 2023/0286478 A1* | 9/2023 | Inami ........................ B60T 7/22 |

FOREIGN PATENT DOCUMENTS

| | | |
|---|---|---|
| JP | 2017-21735 A | 1/2017 |
| JP | 2018-095097 A | 6/2018 |
| JP | 2018-156253 A | 10/2018 |
| JP | 2019-014454 A | 1/2019 |
| JP | 2020-67969 A | 4/2020 |
| KR | 10-2013-0117430 A | 10/2013 |
| KR | 10-2017-0120334 A | 10/2017 |
| WO | 2016/181618 A1 | 11/2016 |

* cited by examiner

VEHICLE CONTROL APPARATUS

CROSS-REFERENCE TO RELATED APPLICATION

This application claims priority to Japanese Patent Application No. 2021-008040, filed on Jan. 21, 2021, in the Japanese Patent Office, the disclosure of which is incorporated herein in its entirety by reference.

BACKGROUND

Field

The invention relates to a vehicle control apparatus which is configured to execute a collision avoiding control.

Description of the Related Art

There is known a vehicle control apparatus which is configured to detect objects around an own vehicle and execute a collision avoiding control of avoiding collision of the own vehicle with the objects (for example, see JP 2018-156253 A). It should be noted that the collision avoiding control is also referred to as pre-crash safety control (Pre-Crash Safety Control).

Hereinafter, the vehicle is regulated to move on the left side of a road. The known apparatus described in JP 2018-156253 A executes the collision avoiding control when (i) the own vehicle is turning right in a traffic intersection, and (ii) the known apparatus determines that the own vehicle is going to collide with the object such as an oncoming vehicle.

When the own vehicle is turning right in the traffic intersection, situations (1) and (2) described below may occur.
  (1) The oncoming vehicle passes the traffic intersection earlier than the own vehicle. That is, the own vehicle passes behind the oncoming vehicle.
  (2) The own vehicle passes the traffic intersection earlier than the oncoming vehicle. That is, the own vehicle passes in front of the oncoming vehicle.

In the situations (1) and (2), the own vehicle moves near the oncoming vehicle but does not collide with the oncoming vehicle. However, the known apparatus may determine that the own vehicle is going to collide with the oncoming vehicle and execute the collision avoiding control.

SUMMARY

The invention has been made for solving the problems described above. An object of the invention is to provide a vehicle control apparatus which can avoid unnecessary execution of the collision avoiding control when the own vehicle turn right or left in the traffic intersection.

According to the invention, a vehicle control apparatus comprises at least one sensor and an electronic control unit. The at least one sensor acquires object information on objects in a surrounding area around an own vehicle, including a forward area ahead of the own vehicle. The electronic control unit is configured to select at least one oncoming vehicle which is in the forward area and moves toward the own vehicle and set the selected at least one oncoming vehicle as a control target vehicle when the own vehicle turns right or left at a traffic intersection. Further, the electronic control unit is configured to acquire a first index value which represents a collision probability that the own vehicle collides with the control target vehicle. Furthermore, the electronic control unit is configured to execute a collision avoiding control of avoiding a collision of the own vehicle with the control target vehicle when the first index value satisfies a predetermined condition.

The electronic control unit is configured to calculate a second index value which represents a degree of turning of the own vehicle since the own vehicle starts turning right or left in the traffic intersection. Further, the electronic control unit is configured to move an area used to select the control target vehicle toward the own vehicle in an opposite direction to a turning direction of the own vehicle as the second index value increases. Furthermore, the electronic control unit is configured to select, as the control target vehicle, the oncoming vehicle which has been in the area for a predetermined time threshold or more.

The vehicle control apparatus according to the invention moves the area used to select the control target vehicle. Thereby, the vehicle control apparatus can select, as the control target vehicle, the oncoming vehicle which provably collides with the own vehicle. Thus, the vehicle control apparatus according to the invention can avoid selecting, as the control target vehicle, the oncoming vehicle in each of the situations (1) and (2) described above.

According to an aspect of the invention, the electronic control unit (10) may be configured to move a center position of the area from a first position to a second portion. In this aspect of the invention, the first position may be a position which is ahead of the own vehicle and remote from a longitudinal axis of the own vehicle in the turning direction of the own vehicle. Further, in this aspect of the invention, the second position may be a position which is ahead of the own vehicle and remote from the longitudinal axis of the own vehicle in an opposite direction to the turning direction of the own vehicle.

According to another aspect of the invention, the electronic control unit may be configured to decrease a size of the area as the second index value increases.

According to further another aspect of the invention, the electronic control unit may be configured to decrease a length of the area in a longitudinal direction of the own vehicle and a length of the area in a right-left direction of the own vehicle.

The vehicle control apparatus according to the aspects of the invention can avoid a situation that the oncoming vehicle at a position relatively far from the own vehicle is in the area. In addition, the vehicle control apparatus can avoid a situation that the oncoming vehicle turning in front of the own vehicle is in the area. Thereby, the unnecessary execution of the collision avoiding control can be avoided.

According to further another aspect of the invention, the electronic control unit may be configured to decrease the predetermined time threshold as a moving speed of the own vehicle increases.

The vehicle control apparatus configured according to this aspect of the invention can select the control target vehicle at an earlier timing and execute the collision avoiding control at a suitable timing when the moving speed of the own vehicle is high.

According to further another aspect of the invention, the vehicle control apparatus may comprise a storing section which stores road information. In this aspect, the electronic control unit may be configured to determine whether a particular lane condition that at least one turn-only lane is provided on a road on which the oncoming vehicle moves, is satisfied, based on the road information, and set the area such that the area does not cover the turn-only lane when the particular lane condition is satisfied.

The vehicle control apparatus configured according to this aspect of the invention can avoid the situation that the oncoming vehicle turning right or left in front of the own vehicle is in the area.

According to one or more embodiments, the electronic control unit may be realized by one or more micro-processors programmed to realize one or more functions described in this description. Further, according to one or more embodiments, the electronic control unit may be entirely or partially realized by hardware configured by integrated circuit such as ASIC dedicated to one or more applications.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Below, embodiments of the invention will be described with reference to the drawings. The drawings show specific embodiments but do not limit a technical scope of the invention.

First Embodiment

Figure 1:
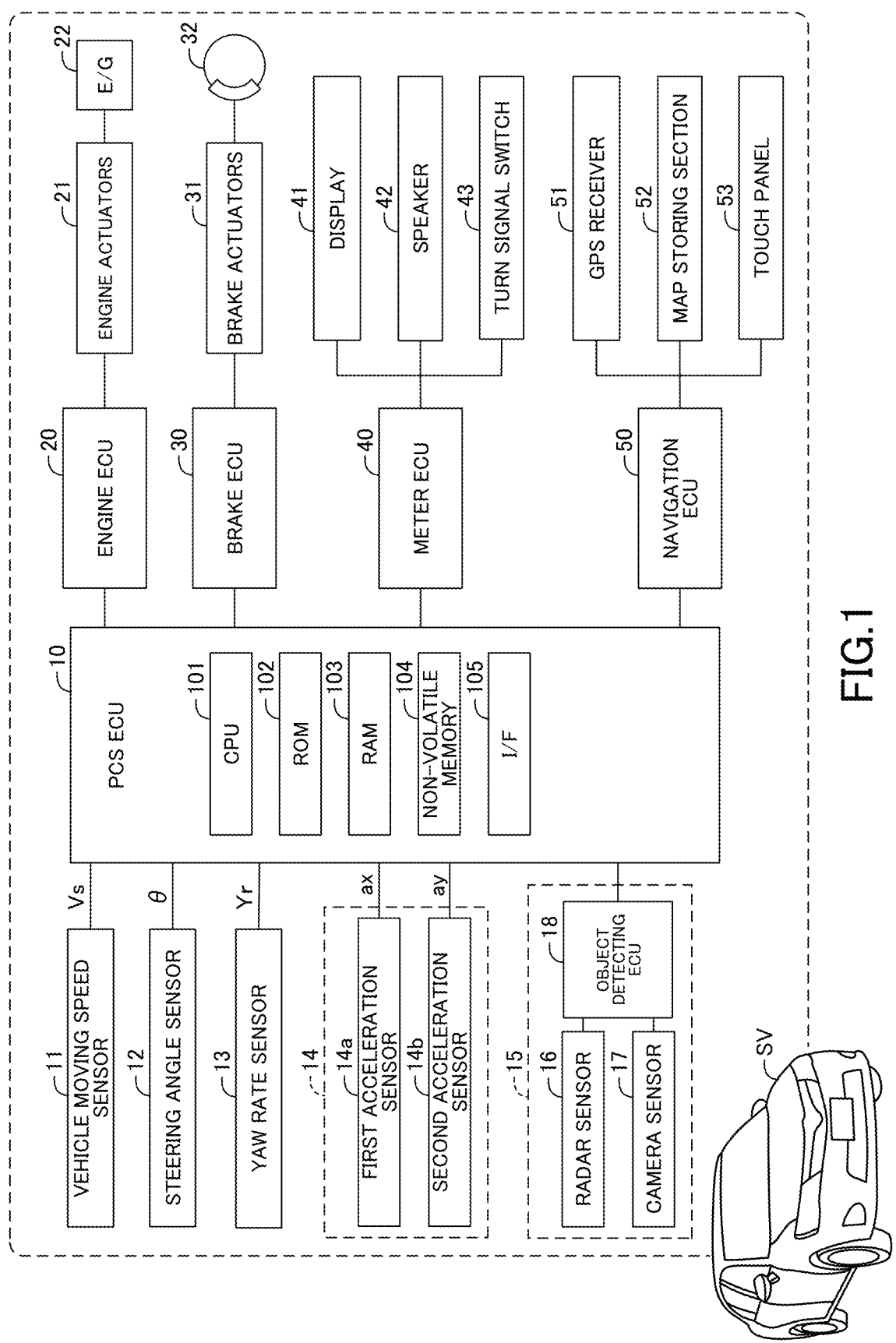
FIG. 1 is a general configuration view which shows a vehicle control apparatus according to a first embodiment of the invention.

As shown in FIG. 1, a vehicle control apparatus according to a first embodiment (this vehicle control apparatus will be also referred to as "first apparatus") is applied to a vehicle SV. The vehicle SV will be also referred to as "own vehicle SV" for distinguishing the own vehicle SV from other vehicles.

The first apparatus includes a collision avoiding ECU 10, an engine ECU 20, a brake ECU 30, a meter ECU 40, and a navigation ECU 50. Some or all of the ECUs 10, 20, 30, 40, and 50 may be integrated into one ECU. Hereinafter, the collision avoiding ECU 10 will be referred to as "PCS ECU 10".

Each of the ECUs 10, 20, 30, 40, and 50 is an electronic control unit which includes a micro-computer as a main component. The ECUs 10, 20, 30, 40, and 50 are electrically connected to send and receive information to and from each other via a CAN (Controller Area Network) not shown.

The micro-computer includes a CPU, a ROM, a RAM, a non-volatile memory, and an interface I/F. For example, the PCS ECU 10 includes a micro-computer which includes a CPU 101, a ROM 102, a RAM 103, a non-volatile memory 104, and an interface (I/F) 105. The CPU 101 is configured or programmed to realize various functions by executing instructions, or programs, or routines stored in the ROM 102.

The PCS ECU 10 is electrically connected to sensors described below. The PCS ECU 10 is configured or programmed to receive detection signals or output signals. Each sensor may be electrically connected to one of the ECUs 20, 30, 40, and 50 other than the PCS ECU 10. In this case, the PCS ECU 10 receives the detection signals or the output signals of the sensors from the ECU to which the sensor is electrically connected via the CAN.

A vehicle moving speed sensor 11 detects a moving speed Vs of the own vehicle SV and outputs signals which represent the moving speed Vs. A steering angle sensor 12 detects a steering angle θ of the own vehicle SV and outputs signals which represent the steering angle θ. A yaw rate sensor 13 detects a yaw rate Yr of the own vehicle SV and outputs signals which represent the yaw rate Yr.

Acceleration sensors 14 include a first acceleration sensor 14a and a second acceleration sensor 14b. The first acceleration sensor 14a detects a first acceleration ax which is an acceleration or a longitudinal acceleration in a longitudinal direction of the own vehicle SV. The first acceleration sensor 14a outputs signals which represent the first acceleration ax. The second acceleration sensor 14b detects a second acceleration ay which is an acceleration or a lateral acceleration in a lateral direction of the own vehicle SV. The second acceleration sensor 14b outputs signals which represent the second acceleration ay.

It should be noted that the steering angle θ, the yaw rate Yr, and the second acceleration ay are zero, respectively when the own vehicle SV moves straight. The steering angle θ, the yaw rate Yr, and the second acceleration ay take positive values when the own vehicle SV turns left. On the other hand, the steering angle θ, the yaw rate Yr, and the second acceleration ay take negative values when the own vehicle SV turns right.

Hereinafter, information which represents a moving state of the own vehicle SV output from the sensors 11 to 14, will be also referred to as "moving state information".

Surrounding sensors 15 are configured to acquire information on standing objects in a surrounding area around the own vehicle SV. The surrounding area around the own vehicle SV includes at least a forward area ahead of the own vehicle SV. In this embodiment, the surrounding area around the own vehicle SV includes the forward area ahead of the own vehicle SV, a right side area of the own vehicle SV, and a left side area of the own vehicle SV. The standing objects include, for example, (i) moving objects such as four-wheel vehicles, two-wheel vehicles, and pedestrians and (ii) non-moving objects such as power poles, trees, and guard rails. Hereinafter, the standing objects will be simply referred to as "objects". The surrounding sensors 15 calculate and output information on the objects (hereinafter, the information on the objects will be referred to as "object information").

Figure 2:
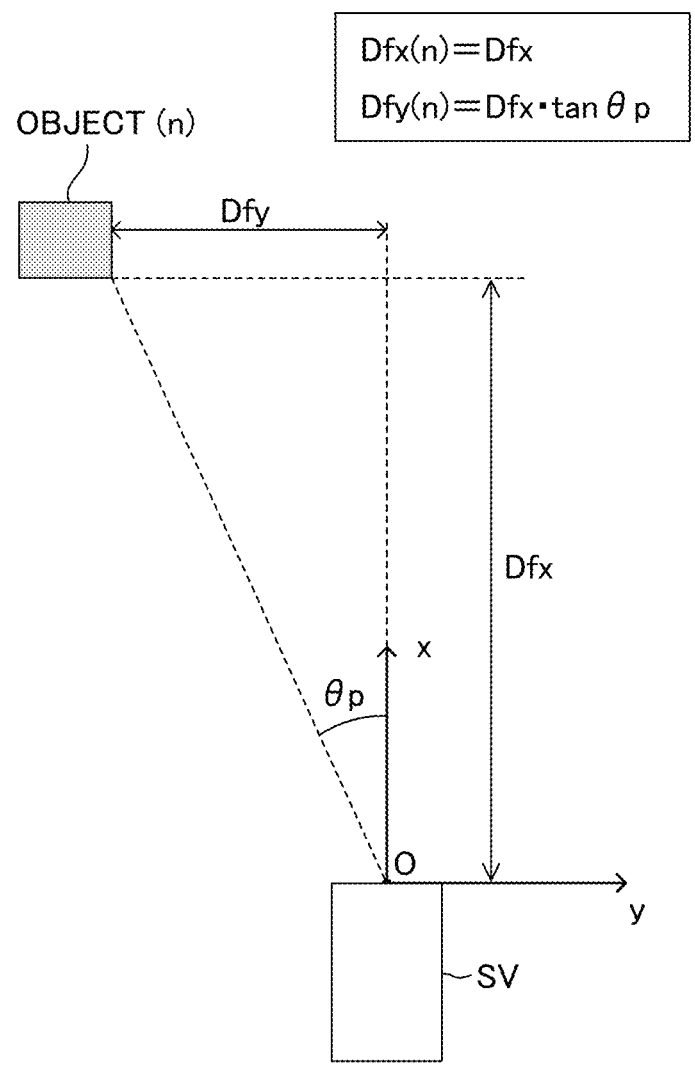
FIG. 2 is a view which describes object information acquired by surrounding sensors.

As shown in FIG. 2, the surrounding sensors 15 acquire the object information, using a two dimension coordinate system. The two dimension coordinate system is defined by an x-axis and a y-axis. An origin of the x-axis and the y-axis is a center position O of a front portion of the own vehicle SV in a width direction of the own vehicle SV. The x-axis is a coordinate axis which extends in a longitudinal direction of the own vehicle SV and passes through the center position O of the front portion of the own vehicle SV. Positions ahead of the own vehicle SV are represented by positive values along the x-axis. The y-axis is a coordinate axis which extends perpendicular to the x-axis. Positions at the right side of the own vehicle SV are represented by positive values along the y-axis.

The object information on the object (n) includes information on longitudinal distances $Dfx(n)$ of the objects (n), lateral positions $Dfy(n)$ of the objects (n), orientations $Op(n)$ of the objects (n), moving directions of the objects (n), relative speeds $Vfx(n)$ of the objects (n), and types of the objects (n).

The longitudinal distance $Dfx(n)$ is a distance in an x-axis direction between the object (n) and the origin O. The longitudinal distance $Dfx(n)$ takes positive and negative values. The lateral distance $Dfy(n)$ is a distance in a y-axis direction between the object (n) and the origin O. The lateral distance $Dfy(n)$ takes positive and negative values. The relative speed $Vfx(n)$ is a moving speed of the object (n) with respect to the own vehicle SV in the x-axis direction. In other words, the relative speed $Vfx(n)$ is a difference between a moving speed Vn of the object (n) in the x-axis direction and the moving speed Vs of the own vehicle SV in the x-axis direction ($Vfx(n)=Vn-Vs$). The orientation $Op(n)$ is an angle defined by the x-axis and a line which connects the origin O and the object (n). The moving direction of the object (n) is a relative moving direction with respect to the own vehicle SV. The type of the object (n) corresponds to information on which the object is, the moving object or the non-moving object. In this embodiment, when the object is the moving-object, the type of the object (n) includes information on which the object is, the four-wheel vehicle, the two-wheel vehicle, or the pedestrian.

Again, referring to FIG. 1, the surrounding sensors 15 include at least one radar sensor 16, at least one camera sensor 17, and an object detecting ECU 18.

The radar sensor 16 includes a radar wave transmitting/receiving section and an information processing section. The radar wave transmitting/receiving section transmits electromagnetic waves such as radio waves of a millimeter wave band (hereinafter, the radio waves of the millimeter wave band will be referred to as "millimeter waves"). In addition, the radar wave transmitting/receiving section receives the millimeter waves which are reflected by the objects in a transmitting area. That is, the radar wave transmitting/receiving section receives reflected waves. The information processing section detects the object (n), based on reflected wave information on (i) a phase difference between the transmitted millimeter wave and the received reflected wave, (ii) an attenuated level of the reflected wave, and (iii) time taken to receive the reflected wave from transmitting the millimeter wave. In addition, the information processing section acquires or calculates the object information on the object (n), based on the reflected wave information.

The camera sensor 17 includes a camera and an image processing section. The camera outputs image data to the image processing section with a predetermined frame rate. The image processing section detects the objects (n) and acquires or calculates the object information on the detected objects (n), based on the image data. In addition, the image processing section recognizes or determines the types of the detected objects (n). The image processing section has stored pattern data of the objects such as the four-wheel vehicles, the two-wheel vehicles, and the pedestrians in a memory (for example, the ROM). The image processing section recognizes which each object (n) is, the four-wheel vehicle, the two-wheel vehicle, or the pedestrian by pattern-matching the image data.

The image processing section may be configured to detect lane markings, based on the image data. The lane markings define lanes. The lane markings include (i) lane markings which define a lane in which the own vehicle SV is moving and (ii) lane markings which define oncoming lanes. Further, the image processing section may be configured to acquire or calculate positions of the lane markings as lane information.

The object detecting ECU 18 determines conclusive object information by synthesizing the object information acquired by the radar sensor 16 and the object information acquired by the camera sensor 17. The object detecting ECU 18 outputs the object information and the lane information to the PCS ECU 10 as vehicle surrounding information.

The engine ECU 20 is electrically connected to engine actuators 21. The engine actuators 21 include a throttle valve actuator which changes an opening degree of a throttle valve of a spark-ignition gasoline injection type of an internal combustion engine 22. The engine ECU 20 can change torque which the internal combustion engine 22 generates by driving the engine actuators 21. The torque generated by the internal combustion engine 22 is transmitted to driven-wheels (not shown) of the own vehicle SV via a transmission (not shown). Thus, the engine ECU 20 can control driving force and change an accelerated state of the own vehicle SV or an acceleration of the own vehicle SV by controlling the engine actuators 21.

When the own vehicle SV is a hybrid vehicle, the engine ECU 20 can control the driving force generated by one or both of the internal combustion engine and at least one electric motor as vehicle driving sources. When the own vehicle SV is an electric vehicle, the engine ECU 20 can control the driving force generated by at least one electric motor as the vehicle driving source.

The brake ECU 30 is electrically connected to brake actuators 31. The brake actuators 31 include hydraulic circuits. The hydraulic circuits include flow passages through which braking liquid flows, valves, at least one pump, and at least one motor which drives the at least one pump. The brake ECU 30 adjusts hydraulic pressure applied to wheel cylinders incorporated in brake mechanisms 32 by controlling the brake actuators 31. The hydraulic pressure causes the wheel cylinders to generate friction braking force applied to wheels of the own vehicle SV. Thus, the brake ECU 30 can control the braking force and change the accelerated state of the own vehicle SV or deceleration or negative acceleration of the own vehicle SV by controlling the brake actuators 31.

The meter ECU 40 is electrically connected to a display 41, a speaker 42, and a turn signal switch 43. The display 41 is a multi-information display provided in front of a driver's seat. The display 41 may be a head-up display. The meter ECU 40 displays an alerting mark (for example, warning lamp) on the display 41 in response to a command from the PCS ECU 10. In addition, the meter ECU 40 outputs alerting sound for alerting a driver of the own vehicle SV from the speaker 42 in response to the command from the PCS ECU 10. Further, the meter ECU 40 blinks left and right turn signal lamps (not shown) in response to a signal from the turn signal switch 43. The meter ECU 40 sends an activated state of the left or right turn signal lamps to the PCS ECU 10.

The navigation ECU 50 is electrically connected to a GPS receiver 51, a map storing section 52, and a touch panel 53. The GPS receiver 51 receives GPS signals used to detect a longitude and a latitude of a place where the own vehicle SV is located. The map storing section 52 stores map information. The map information includes road information. The road information includes information on positions of lanes, the number of the lanes, lengths of the lanes in a width direction of a road (i.e., widths of the lanes), and types of the lanes (for example, a right-turn-only lane or a left-turn-only lane). The navigation ECU 50 performs various calculation processing, based on (i) the longitude and the latitude of the place where the own vehicle SV is located and (ii) the map information and displays a position of the own vehicle SV on a map on the touch panel 53.

<Summary of Collision Avoiding Control>

When the PCS ECU 10 is configured to determine that a predetermined PCS execution condition is satisfied, based on a method described later, the PCS ECU 10 executes the known collision avoiding control. The collision avoiding control of this embodiment is a control of (i) avoiding collision of the own vehicle SV with oncoming vehicles when the own vehicle SV is turning right or (ii) reducing damage derived from the collision of the own vehicle SV with the oncoming vehicles when the own vehicle SV is turning right. Hereinafter, this collision avoiding control will be referred to "PCS control".

In particular, the PCS ECU 10 determines whether the own vehicle SV starts turning right, based on the activated state of the right turn signal lamps and/or the moving state information such as the steering angle $\theta$ and the yaw rate Yr. For example, when the right turn signal lamps are turned on, and the yaw rate Yr is smaller than a predetermined right-turn start threshold (a negative value) Yrth, the PCS ECU 10 determines that the own vehicle SV starts turning right.

Next, the PCS ECU 10 recognizes the objects in the surrounding area around the own vehicle SV, based on the object information included in the vehicle surrounding information.

Figure 3:
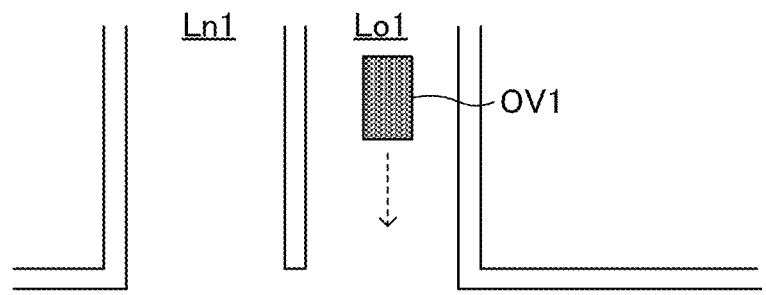
FIG. 3 is a view which shows a situation that an own vehicle is turning right and there is an oncoming vehicle.
Figure 3:
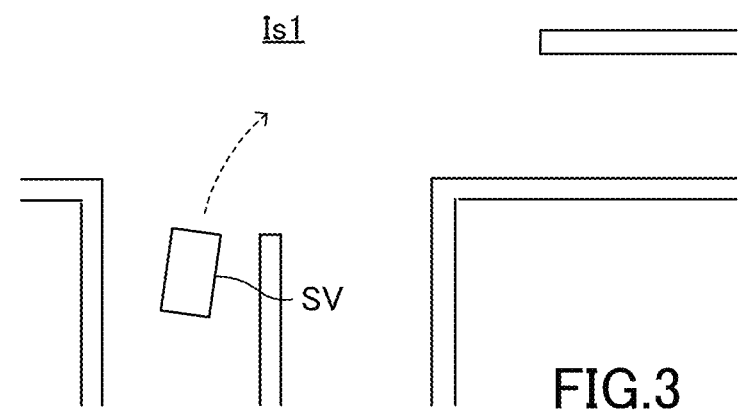

Then, the PCS ECU 10 selects or picks up the oncoming vehicles which are in the forward area ahead of the own vehicle SV and are moving toward the own vehicle SV from among the recognized objects. In this embodiment, the oncoming vehicles include the four-wheel vehicles or the two-wheel vehicles. The selected oncoming vehicles are candidates of the oncoming vehicles which are a target vehicles of the PCS control. Hereinafter, the selected oncoming vehicles will be referred to as "control target candidate vehicles". Further, the oncoming vehicles which are the target vehicles of the PCS control will be referred to as "control target vehicles". Below, processes of selecting the control target candidate vehicles will be described In an example shown in FIG. 3, the own vehicle SV moves in a first traffic lane Ln1. The own vehicle SV is turning right in a traffic intersection Is1. Further, a first other vehicle OV1 moves in a first oncoming lane Lo1. The first oncoming lane Lo1 is an oncoming lane for the first moving lane Ln1.

Figure 4:
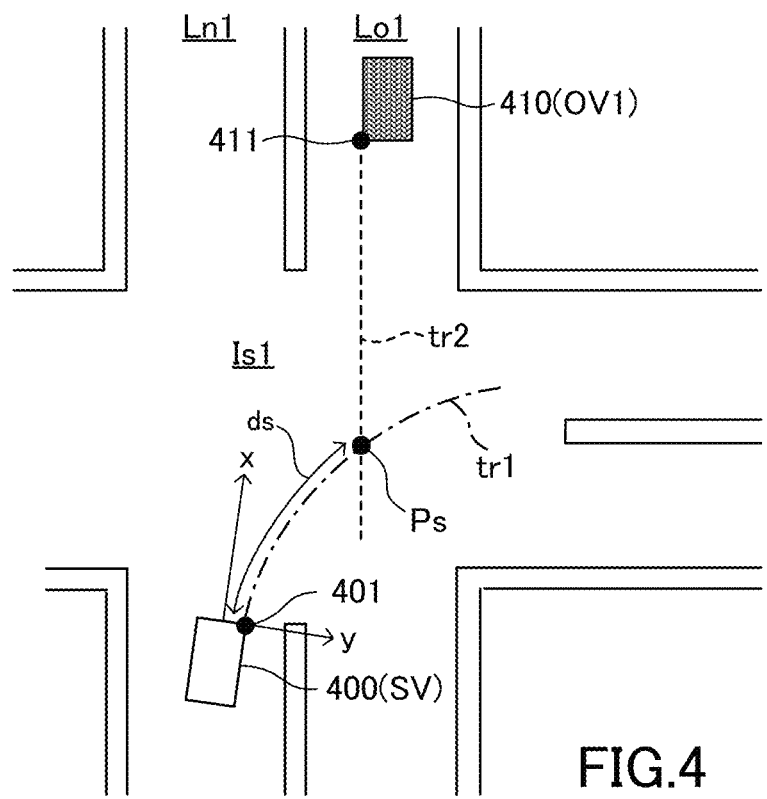
FIG. 4 is a view which describes a flow of processes of selecting the oncoming vehicle as a control target candidate vehicle.

The PCS ECU 10 recognizes the first other vehicle OV1, based on the object information. Then, as shown in FIG. 4, the PCS ECU 10 draws the own vehicle SV and the first other vehicle OV1 in a simplified manner on the two dimension coordinate system. In particular, the PCS ECU 10 draws a first rectangle 400 on the two dimension coordinate system. The first rectangle 400 represents a body of the own vehicle SV. The ROM 102 has stored information on a size of the body of the own vehicle SV. The PCS ECU 10 sets a size of the first rectangle 400, based on this stored information on the size of the body of the own vehicle V. In addition, the PCS ECU 10 draws a second rectangle 410 on the two dimension coordinate system. The second rectangle 410 represents a body of the first other vehicle OV1. A size of the second rectangle 410 may be set, based on a size of a body of a general vehicle.

The PCS ECU 10 specifies an apex 401 nearest the second rectangle 410 among apexes of the first rectangle 400. Hereinafter, the apex 401 will be referred to as "first apex 401". The first apex 401 corresponds to a right corner portion of the front portion of the own vehicle SV. In addition, the PCS ECU 10 specifies an apex 411 nearest the first rectangle 400 among apexes of the second rectangle 410. Hereinafter, the apex 411 will be referred to as "second apex 411". The second apex 411 corresponds to a right corner portion of a front portion of the first other vehicle OV1.

The PCS ECU 10 draws a first predicted route tr1 on the two dimension coordinate system, based on the moving state information. The first predicted route tr1 is a route which the first apex 401 passes during a period from the current point of time (a first pint of time) to a second point of time assuming that the own vehicle SV moves with maintaining the current moving state such as the moving speed Vs and the yaw rate Yr. The second point of time is a time after the current point of time by a predetermined time ta.

The PCS ECU 10 calculates (i) a moving direction of the first other vehicle OV1 and (ii) a moving speed Vo1 of the first other vehicle OV1, based on the object information. Then, the PCS ECU 10 draws a second predicted route tr2 on the two dimension coordinate system, based on (i) the moving direction of the first other vehicle OV1 and (ii) the moving speed Vo1 of the first other vehicle OV1. The second predicted route tr2 is a route which the second apex 411 passes during the period from the current point of time (the first point of time) to the second point of time assuming that the first other vehicle OV1 moves with maintaining the current moving state such as the moving direction and the moving speed Vo1.

The PCS ECU 10 determines whether the first predicted route tr1 and the second predicted route tr2 cross each other. When the first predicted route tr1 and the second predicted route tr2 cross each other, the own vehicle SV has a probability of colliding with the first other vehicle OV1. In this case, the PCS ECU 10 selects the first other vehicle OV1 as the control target candidate vehicle.

Then, the PCS ECU 10 selects or sets the control target candidate vehicle as the control target vehicle when the control target candidate vehicle in question satisfies a predetermined condition described below (hereinafter, this predetermined condition will be referred as "control target condition").

When the PCS ECU 10 selects the control target candidate vehicle or the first other vehicle OV1 as the control target vehicle, the PCS ECU 10 determines whether the predetermined PCS execution condition is satisfied. The predetermined PCS execution condition is a condition used to determine whether to execute or start an execution of the PCS control.

The predetermined PCS execution condition is a condition which relates to a first index value. The first index value represents collision probability that the own vehicle SV collides with the control target vehicle. In this embodiment, the first index value is time Tc which will be taken for the own vehicle SV to reach a moving path of the first other vehicle OV1 or the second predicted route tr2. It should be noted that the time Tc is a margin time until the own vehicle SV collides with the first other vehicle OV1. Hereinafter, the time Tc will be referred to as "first index value Tc".

In particular, as show in FIG. 4, the PCS ECU 10 acquires a crossing position Ps at which the first predicted route tr1 and the second predicted route tr2 cross each other. Then, the PCS ECU 10 acquires time which is predictively taken for the first apex 401 to reach the crossing position Ps as the first index value Tc, based on the moving state information such as the moving speed Vs and the yaw rate Yr.

When the first index value Tc becomes equal to or smaller than a predetermined first time threshold Tcth, the PCS ECU 10 determines that the predetermined PCS execution condition becomes satisfied and executes the PCS control.

The PCS control includes (i) a driving force limiting control of limiting the driving force applied to the own vehicle SV, (ii) a braking force control of applying the braking force to the wheels of the own vehicle SV, and (iii) an alerting control of alerting the driver of the own vehicle SV. In particular, the PCS ECU 10 sends driving command signals to the engine ECU 20. When the engine ECU 20 receives the driving command signals from the PCS ECU 10, the engine ECU 20 controls the engine actuators 21 to limit the driving force such that the actual acceleration of the own vehicle SV corresponds to a target acceleration AG (for example, zero) represented by the driving command signals. In addition, the PCS ECU 10 sends braking command signals to the brake ECU 30. When the brake ECU 30 receives the braking command signals from the PCS ECU 10, the brake ECU 30 controls the brake actuators 31 to apply the braking force to the wheels of the own vehicle SV such that the actual acceleration of the own vehicle SV corresponds to a target deceleration TG represented by the braking command signals. In addition, the PCS ECU 10 sends alerting command signals to the meter ECU 40. When the meter ECU 40 receives the alerting command signals from the PCS ECU 10, the meter ECU 40 displays the alerting mark on the display 41 and outputs the alerting sound from the speaker 42.

<Summary of Operations>

As described above, the known apparatus may execute the PCS control in the situations (1) and (2) described above. That is, the known apparatus may execute the PCS control in a situation that the PCS control should not be executed. In order to solve this problem, the PCS ECU 10 of this embodiment selects the control target vehicles, using change of a positional relationship between the own vehicle SV and the first other vehicle OV1.

Figure 5:
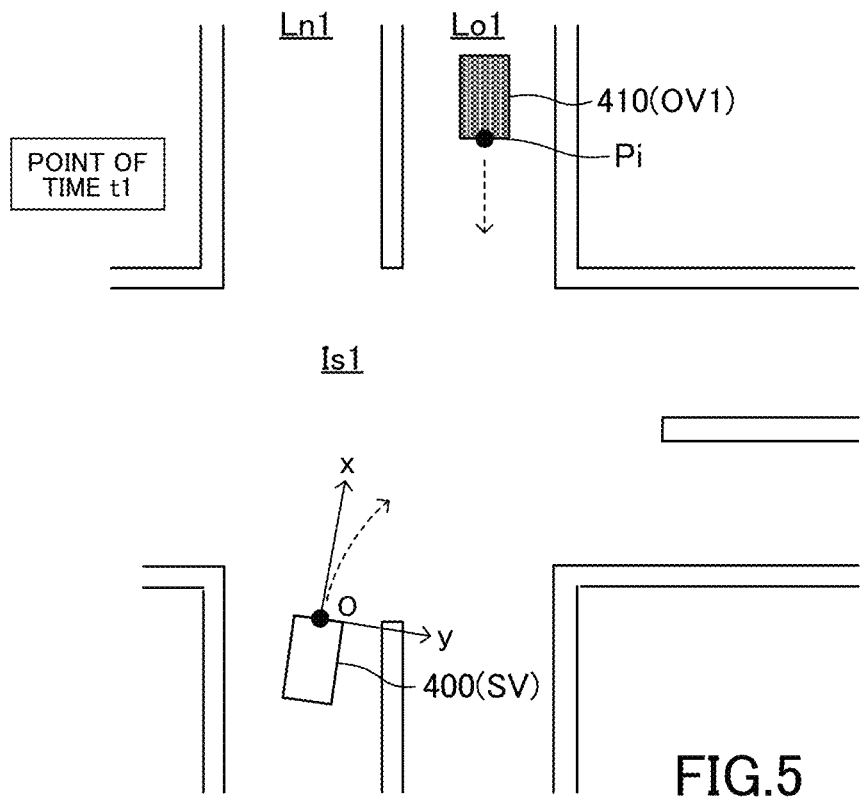
FIG. 5 is a view which shows a positional relationship between the own vehicle and the oncoming vehicle at a point of time t1.

FIG. 5 shows the same situation as the situation shown in FIG. 4. Thus, FIG. 5 shows a positional relationship between (i) the first rectangle 400 or the own vehicle SV and (ii) the second rectangle 410 or the first other vehicle OV1 at a point of time t1. Below, a description "(xi, yi)" represents an x-y-coordinate of a center position Pi of the second rectangle 410 on the two dimension coordinate system. The center position Pi is a center position of the front portion of the first other vehicle OV1 in a width direction of the first other vehicle OV1. Hereinafter, the center position Pi of the second rectangle 410 will be referred to as "position Pi of the first other vehicle OV1".

At the point of time t1, the own vehicle SV starts turning right. At the point of time t1, a distance in the longitudinal direction of the own vehicle SV between the own vehicle SV and the first other vehicle OV1 is long. That is, the longitudinal distance Dfx is long. Thus, a value of the x-coordinate xi of the position Pi of the first other vehicle OV1 on the two dimension coordinate system is a relatively great positive value. In addition, the first other vehicle OV1 is at the right side of a longitudinal axis of the own vehicle SV. That is, the first other vehicle OV1 is at the right side of the x-axis. Thus, a value of the y-coordinate yi of the position Pi of the first other vehicle OV1 on the two dimension coordinate system is a positive value.

Figure 6:
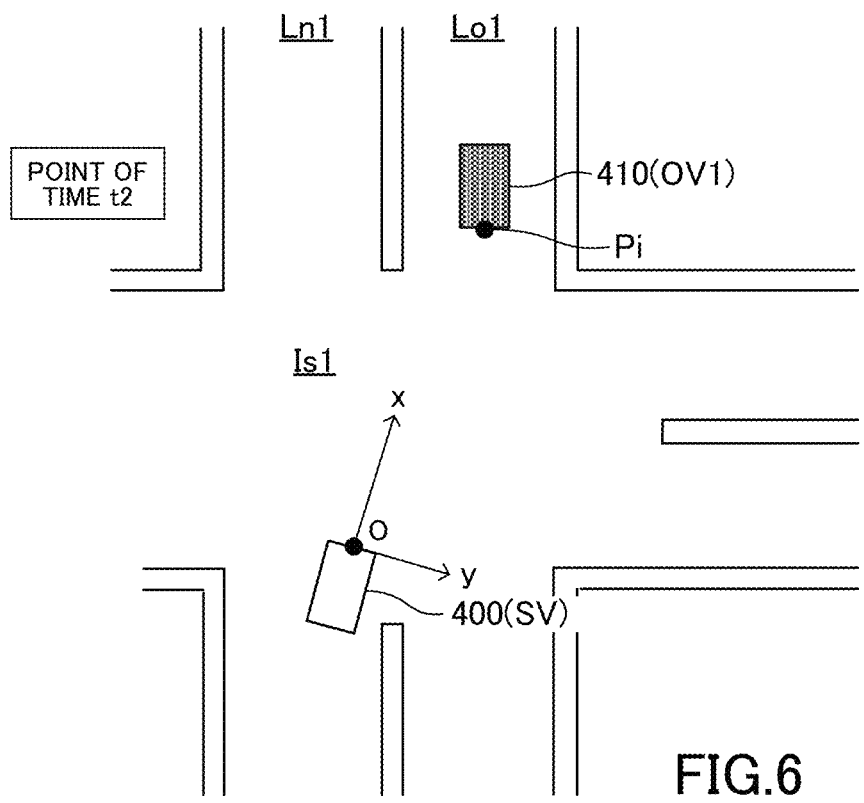
FIG. 6 is a view which shows the positional relationship between the own vehicle and the oncoming vehicle at a point of time t2.

FIG. 6 shows a positional relationship between the own vehicle SV and the first other vehicle OV1 at a point of time t2 after the point of time t1. The own vehicle SV has entered in the traffic intersection Is1. The first other vehicle OV1 has approached the traffic intersection Is1 since the point of time t1.

A degree of right turning of the own vehicle SV or a degree that the own vehicle SV turns right at the point of time t2 is greater than the degree of right turning of the own vehicle SV at the point of time t1. The longitudinal distance Dfx between the own vehicle SV and the first other vehicle OV1 at the point of time t2 is shorter than the longitudinal distance Dfx between the own vehicle SV and the first other vehicle OV1 at the point of time t1. Thus, the value of the x-coordinate xi of the position Pi of the first other vehicle OV1 at the point of time t2 is smaller than the value of the x-coordinate xi of the position Pi of the first other vehicle OV1 at the point of time t1. Also, the value of the y-coordinate yi of the position Pi of the first other vehicle OV1 at the point of time t2 is smaller than the value of the y-coordinate yi of the position Pi of the first other vehicle OV1 at the point of time t1.

Figure 7:
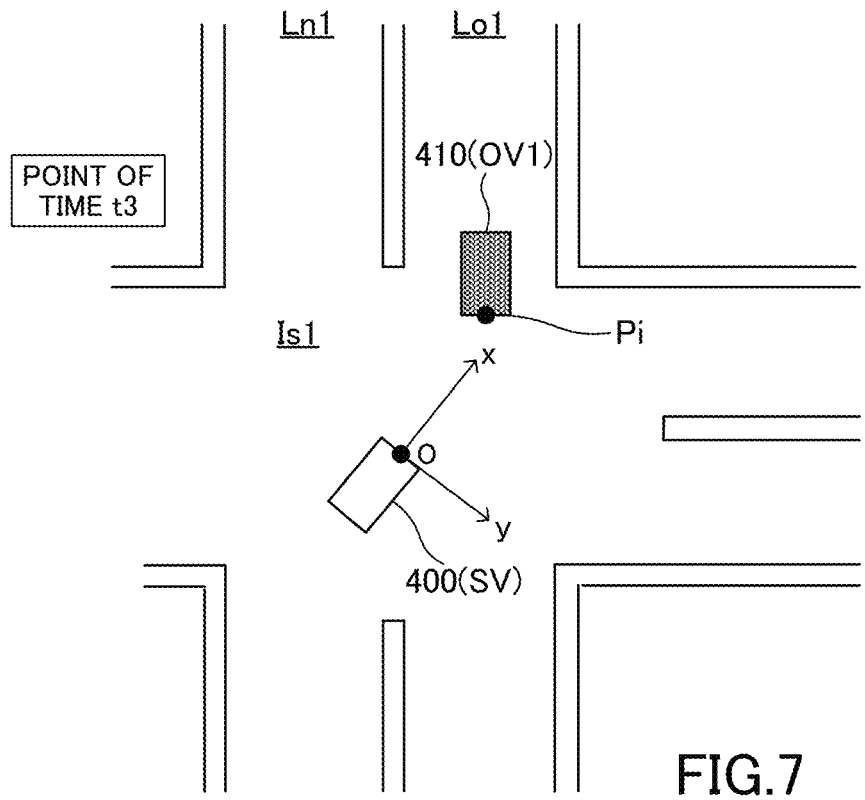
FIG. 7 is a view which shows the positional relationship between the own vehicle and the oncoming vehicle at a point of time t3.

FIG. 7 shows the positional relationship between the own vehicle SV and the first other vehicle OV1 at a point of time t3 after the point of time t2. At the point of time t3, the own vehicle SV is entering in the first oncoming lane Lo1. On the other hand, the first other vehicle OV1 has entered in the traffic intersection Is1.

The degree of right turning of the own vehicle SV at the point of time t3 is greater than the degree of right turning of the own vehicle SV at the point of time t2. The longitudinal distance Dfx between the own vehicle SV and the first other vehicle OV1 at the point of time t3 is shorter than the longitudinal distance Dfx between the own vehicle SV and the first other vehicle OV1 at the point of time t2. Thus, the value of the x-coordinate xi of the position Pi of the first other vehicle OV1 at the point of time t3 is smaller than the value of the x-coordinate xi of the position Pi of the first other vehicle OV1 at the point of time t2. Also, the value of the y-coordinate yi of the position Pi of the first other vehicle OV1 at the point of time t3 is smaller than the value of the y-coordinate yi of the position Pi of the first other vehicle OV1 at the point of time t2. Thus, at the point of time t3, the own vehicle SV has approached the first other vehicle OV1. Thus, the own vehicle SV has the high probability of finally colliding with the first other vehicle OV1.

Figure 8:
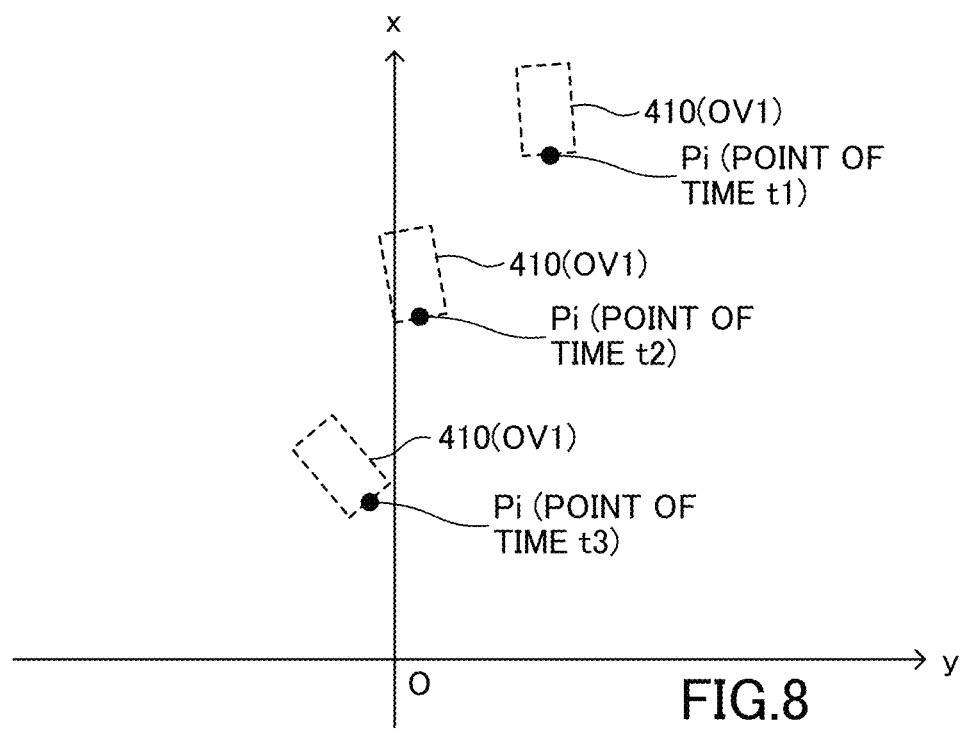
FIG. 8 is a view which shows change of a position of the oncoming vehicle on a two-dimension coordinate system.

FIG. 8 shows the positions Pi of the first other vehicle OV1 at the point of time t1, the point of time t2, and the point of time t3. As can be understood from FIG. 8, when the positional relationship between the own vehicle SV and the first other vehicle OV1 on the two dimension coordinate system changes as described below, the own vehicle SV has the high probability of finally colliding with the first other vehicle OV1.

As time elapses from the point of time t1 when the own vehicle SV starts turning right, the value of the x-coordinate xi of the position Pi of the first other vehicle OV1 decreases, and the value of the y-coordinate yi of the position Pi of the first other vehicle OV1 also decreases. In other words, as the degree of right turning of the own vehicle SV increases since the point of time t1, the value of the x-coordinate xi of the position Pi of the first other vehicle OV1 decreases, and the value of the y-coordinate yi of the position Pi of the first other vehicle OV1 also decreases.

In particular, when changes of the values described below are detected, the own vehicle SV has the high probability of finally colliding with the first other vehicle OV1.

(A) The value of the x-coordinate xi of the position Pi of the first other vehicle OV1 is a relatively great positive value at the point of time t1 when the degree of right turning of the own vehicle SV is small. In addition, the value of the x-coordinate xi of the position Pi of the first other vehicle OV1 is a relatively small positive value at the point of time t3 when the degree of right turning of the own vehicle SV is great.

(B) The value of the y-coordinate yi of the position Pi of the first other vehicle OV1 is a positive value at the point of time t1 when the degree of right turning of the own vehicle SV is small. In addition, the value of the y-coordinate yi of the position Pi of the first other vehicle OV1 is a negative value at the point of time t3 when the degree of right turning of the own vehicle SV is great.

Figure 9:
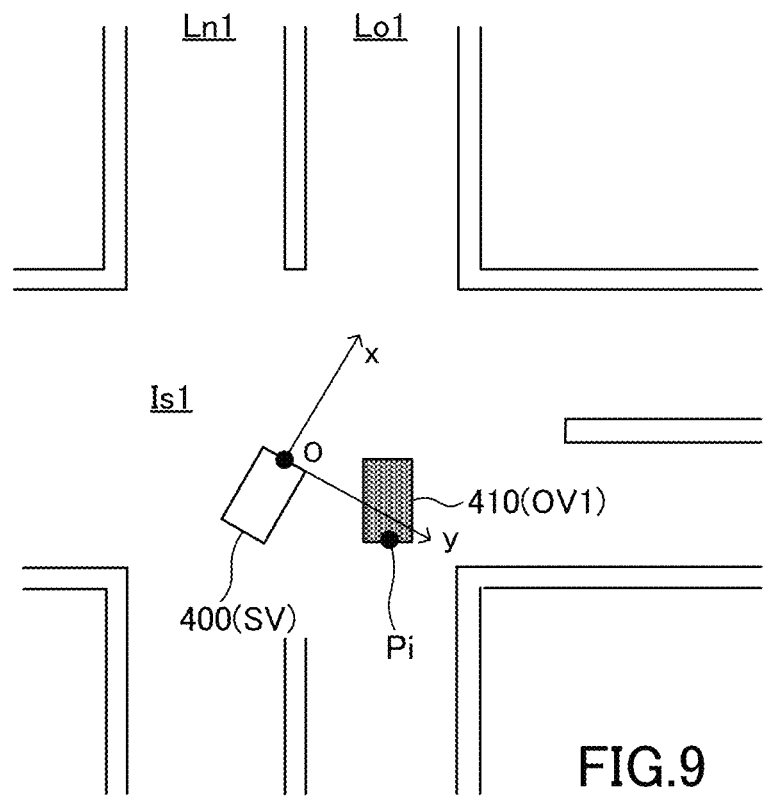
FIG. 9 is a view which shows a situation that the oncoming vehicle passes a traffic intersection earlier than the own vehicle.
Figure 10:
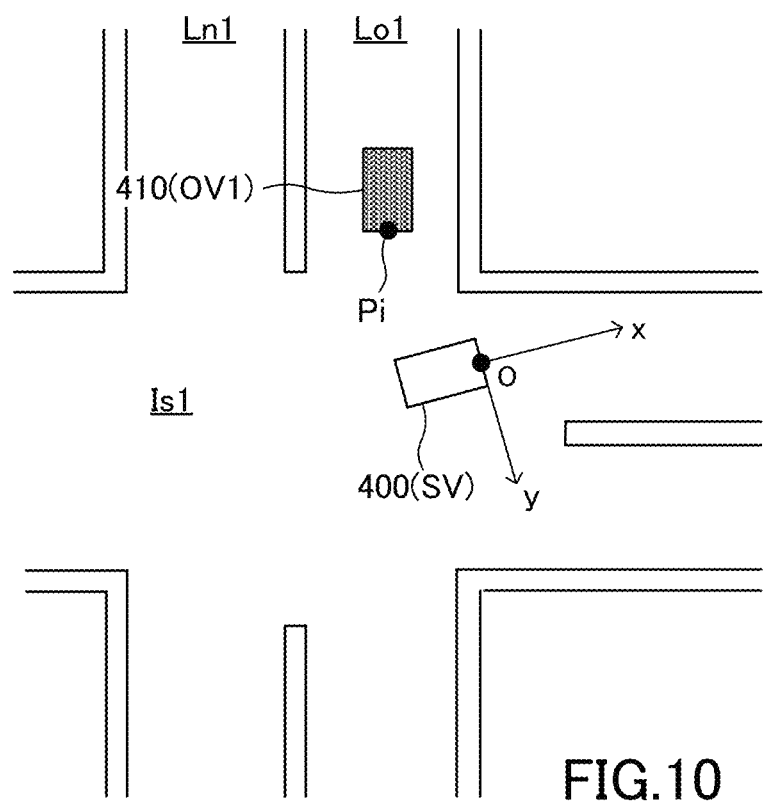
FIG. 10 is a view which shows a situation that the own vehicle passes the traffic intersection earlier than the oncoming vehicle.

On the other hand, in the situation (1) described above, as shown in FIG. 9, the value of the x-coordinate xi of the position Pi of the first other vehicle OV1 is a negative value at a point of time when the degree of right turning of the own vehicle SV is relatively small. In addition, in the situation (2) described above, as shown in FIG. 10, the values of the x-coordinate xi and the y-coordinate yi of the position Pi of the first other vehicle OV1 are negative values at a point of time when the degree of right turning of the own vehicle SV is great.

Figure 11:
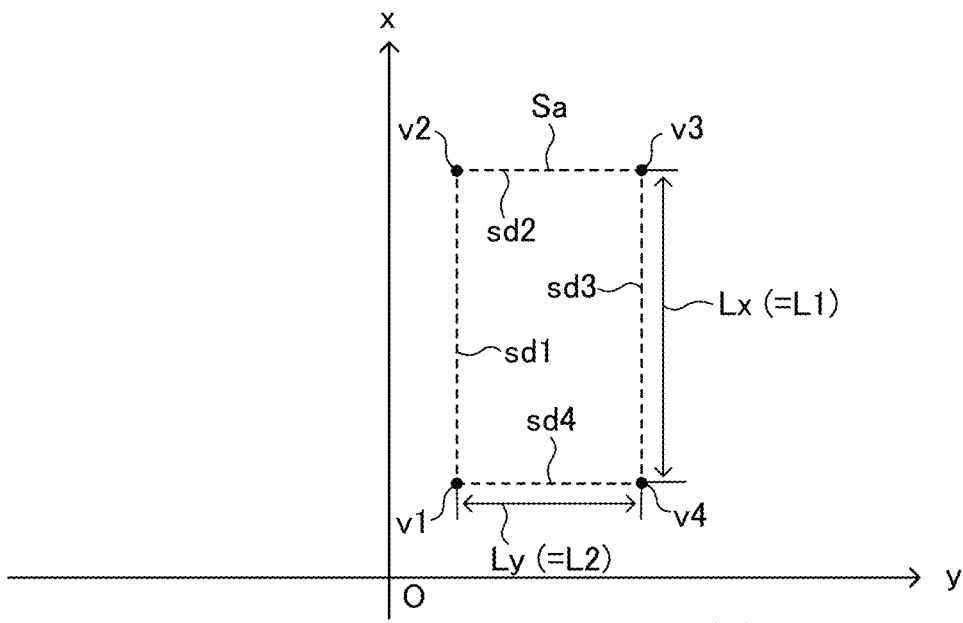
FIG. 11 is a view which shows an area Sa used to select the control target vehicle.

In consideration of the situations described above, the PCS ECU 10 sets an area Sa on the two dimension coordinate system. The area Sa is used to select the control target vehicles. The area Sa of this embodiment is a rectangular area ahead of the own vehicle SV. That is, the area Sa of this embodiment is a rectangular area in an area that the value of the x-coordinate is positive. Long sides and short sides of the area Sa are parallel to the x-axis and the y-axis, respectively. As shown in FIG. 11, the area Sa is defined by four vertexes v1 to v4.

An x-coordinate value of the vertex v1 is a smallest one of the four vertexes v1 to v4 of the area Sa. A y-coordinate value of the vertex v1 is a smallest one of the four vertexes v1 to v4 of the area Sa.

The x-coordinate value of the vertex v2 is a greatest one of the four vertexes v1 to v4 of the area Sa. The y-coordinate value of the vertex v2 is the same as the y-coordinate value of the vertex v1.

The x-coordinate value of the vertex v3 is the same as the x-coordinate value of the vertex v2. The y-coordinate value of the vertex v3 is a greatest one of the four vertexes v1 to v4 of the area Sa.

The x-coordinate value of the vertex v4 is the same as the x-coordinate value of the vertex v1. The y-coordinate value of the vertex v4 is the same as the y-coordinate value of the vertex v3.

Hereinafter, a side between the vertex v1 and the vertex v2 will be referred to as "first side sd1", a side between the vertex v2 and the vertex v3 will be referred to as "second side sd2", a side between the vertex v3 and the vertex v4 will be referred to as "third side sd3", and a side between the vertex v4 and the vertex v1 will be referred to as "fourth side sd4".

A length Lx of the area Sa in the x-axis direction or the longitudinal direction of the own vehicle SV is a predetermined first length L1. A length Ly of the area Sa in the y-axis direction or the right-left direction of the own vehicle SV is a predetermined second length L2. In this embodiment, the predetermined first length L1 is longer than the predetermined second length L2.

As described above, when the right turn signal lamp is turned on, and the yaw rate Yr is smaller than a right-turn start threshold Yrth, the PCS ECU 10 determines that the own vehicle SV starts turning right. A point of time when the PCS ECU 10 determines that the own vehicle SV starts turning right is a point of time when the own vehicle SV starts turning right. Thus, hereinafter, the point of time when the PCS ECU 10 determines that the own vehicle SV starts turning right will be referred to as "turning start point of time". The PCS ECU 10 calculates a second index value. The second index value represents the degree of turning of the own vehicle SV since the turning start point of time. That is, the second index value represents a moving degree of the own vehicle SV since the turning start point of time. In this embodiment, the second index value is a time integration value dgt of an absolute value of the yaw rate Yr since the turning start point of time. Hereinafter, the time integration value dgt will be referred to as "second index value dgt". Thus, as the degree of turning of the own vehicle SV increases, the second index value dgt increases.

Figure 12:
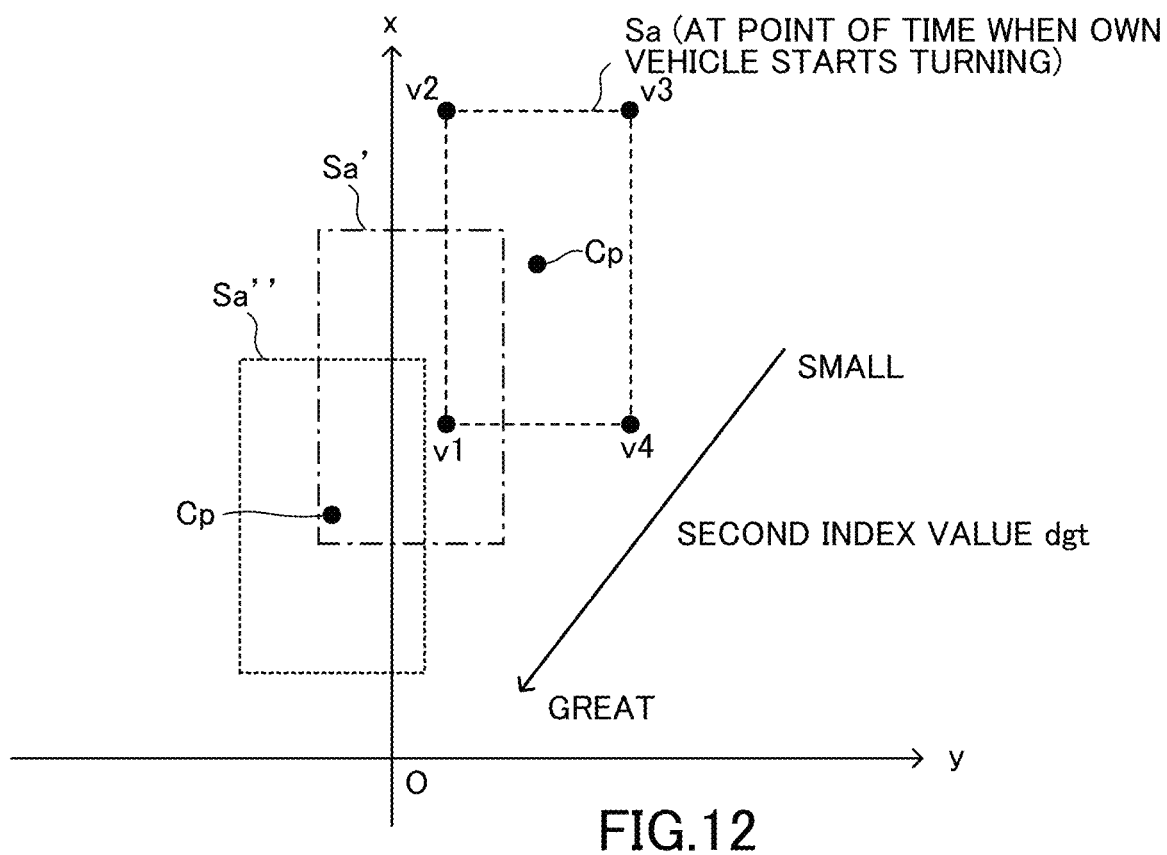
FIG. 12 is a view which shows change of the area Sa on the two-dimension coordinate system according to the first embodiment.

As shown in FIG. 12, the PCS ECU 10 moves the area Sa on the two dimension coordinate system, based on the second index value dgt. In particular, the PCS ECU 10 moves the area Sa in a negative direction of the x-axis and in a negative direction of the y-axis as the second index value dgt increases. That is, as the second index value dgt increases, the PCS ECU 10 moves the area Sa toward the own vehicle SV in an opposite direction to a turning direction of the own vehicle SV or the right direction. Thereby, a position of the second side sd2 and a position of the fourth side sd4 gradually approach the own vehicle SV or move in a negative direction of the x-axis, and a position of the first side ad1 and a position of the third side sd3 gradually move in the opposite direction to the turning direction of the own vehicle SV or a negative direction of the y-axis. It should be noted that the PCS ECU 10 moves the area Sa within an area that the value of the x-coordinate is positive. That is, the PCS ECU 10 moves the area Sa within an area above the y-axis.

In particular, at the turning start point of time, the x-coordinate values of the vertexes v1 to v4 of the area Sa are positive, and the y-coordinate values of the vertexes v1 to v4 of the area Sa are positive. Thus, at the turning start point of time, a center position Cp of the area Sa is set at a position which is ahead of the own vehicle SV and remote from the longitudinal axis of the own vehicle SV or the x-axis in the turning direction or the right direction. It should be noted that the center position Cp of the area Sa is a geometric gravity center of the area Sa.

As the second index value dgt increases, the x-coordinate values of the vertexes v1 to v4 gradually increase, and the y-coordinate values of the vertexes v1 to v4 gradually decrease (see an area Sa' and an area Sa").

When the second index value dgt becomes greater than a predetermined value, the y-coordinate values of the vertex v1 and the vertex v2 become negative (for example, see the area Sa'). Finally, the x-coordinate value of the center position Cp of the area Sa is positive, and the y-coordinate value of the center position Cp of the area Sa is negative (see the area Sa"). Thereby, the center position Cp of the area Sa is finally set at a position which is ahead of the own vehicle SV and remote from the longitudinal axis of the own vehicle SV or the x-axis in the opposite direction to the turning direction or the left direction.

As described above, the PCS ECU 10 moves the center position Cp of the area Sa from a first position to a second position. In this regard, the first position corresponds to the center position Cp of the area Sa and is a position which is ahead of the own vehicle SV and remote from the longitudinal axis of the own vehicle SV in the turning direction or the right direction. Further, the second position corresponds to the center position Cp of the area Sa" and is a position which is ahead of the own vehicle SV and remote from the longitudinal axis of the own vehicle SV in the opposite direction to the turning direction or the left direction.

A fact that the first other vehicle OV1 continues to be in the area Sa moved as described above means that the own vehicle SV has a high probability of colliding with the first other vehicle OV1. Thus, in this embodiment, the control target condition is a condition that the position Pi of the control target candidate vehicle (the first other vehicle OV1) continues to be in the area Sa for a predetermined second time threshold Tmth or more. The PCS ECU 10 selects or sets, as the control target vehicle, the control target candidate vehicle which satisfies the control target condition described above.

Operation Examples

Figure 13:
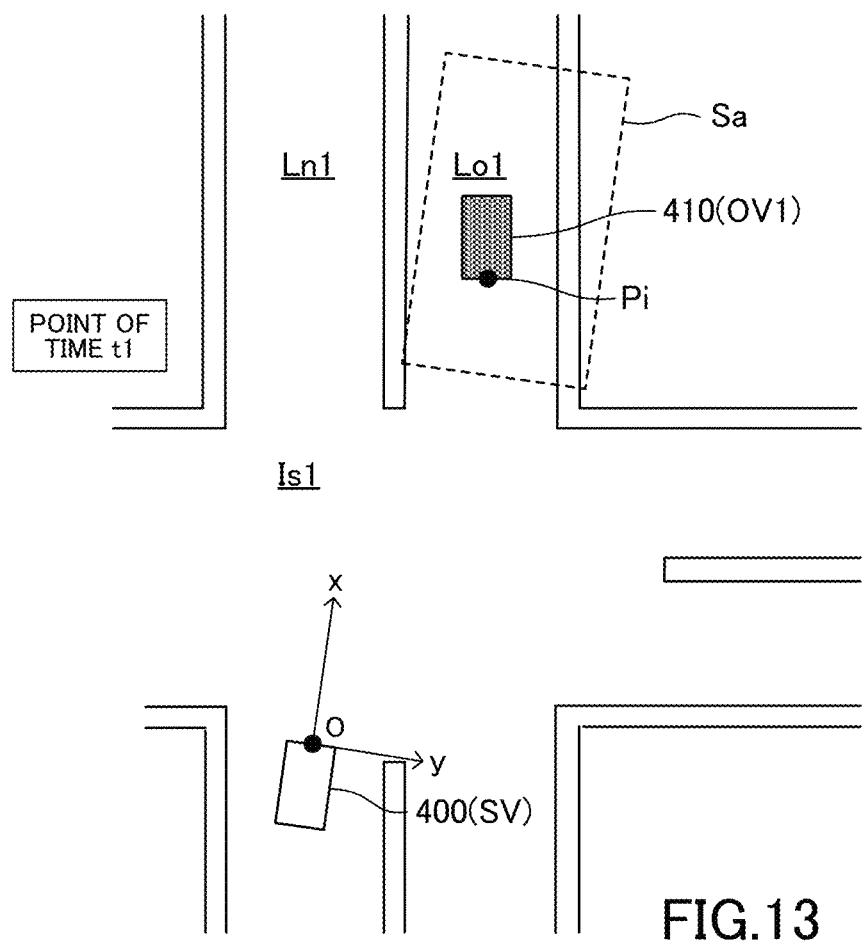
FIG. 13 is a view which describes a flow of processes of selecting the oncoming vehicle as the control target vehicle.
Figure 14:
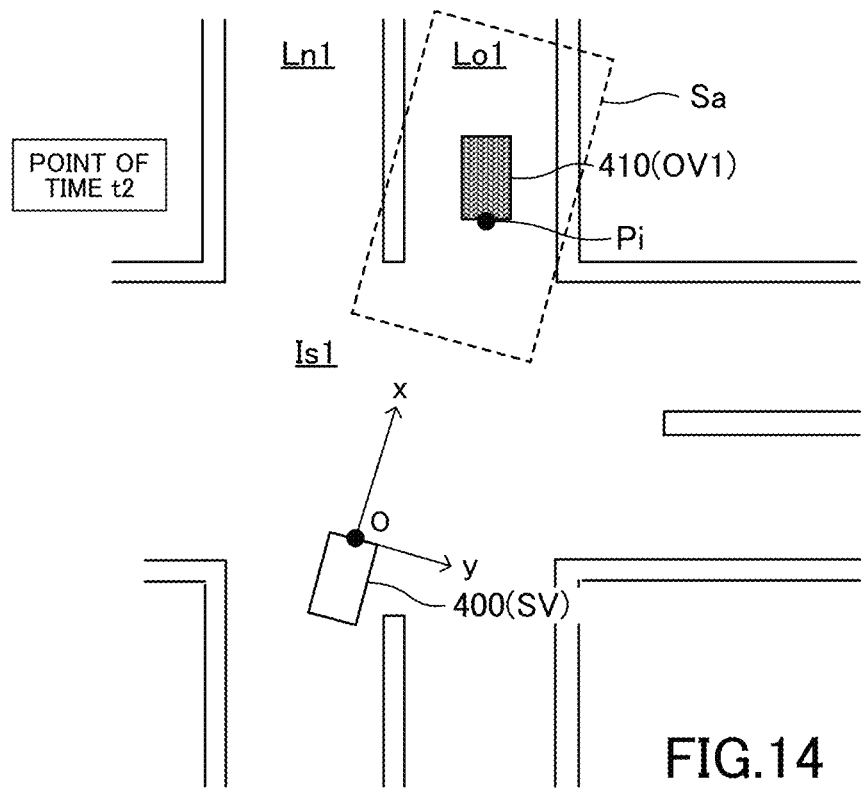
FIG. 14 is a view which describes the flow of the processes of selecting the oncoming vehicle as the control target vehicle.
Figure 15:
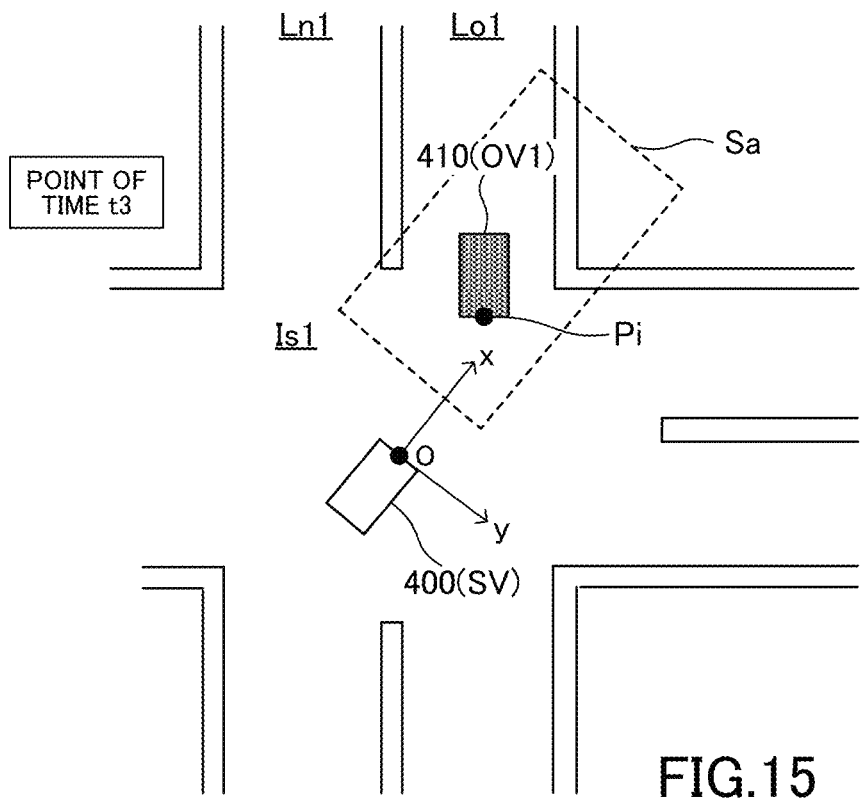
FIG. 15 is a view which describes the flow of the processes of selecting the oncoming vehicle as the control target vehicle.

Processes of selecting the control target vehicles will be described with reference to FIG. 13 to FIG. 15. FIG. 13 to FIG. 15 show the same situations as the situations shown in FIG. 5 to FIG. 7, respectively.

<Point of Time t1>

As shown in FIG. 13, at the point of time t1, the right turn signal lamps are turned on, and the yaw rate Yr is smaller than the predetermined right-turn start threshold Yrth. Thus, the PCS ECU 10 determines that the own vehicle SV starts turning right. Then, the PCS ECU 10 selects the first other vehicle OV1 as the control target candidate vehicle. Then, the PCS ECU 10 calculates the second index value dgt. Then, the PCS ECU 10 acquires the x-coordinate values and the y-coordinate values of four vertexes v1 to v4 which define the area Sa by applying the second index value dgt to a map MP(dgt). The map MP(dgt) defines a relationship between the second index value dgt and the x-coordinate and y-coordinate values of the four vertexes v1 to v4. Then, the PCS ECU 10 sets the area Sa ahead of the own vehicle SV. This area Sa corresponds to the area Sa shown in FIG. 12. The PCS ECU 10 determines that the position Pi of the first other vehicle OV1 is in the area Sa.

<Point of Time t2>

As shown in FIG. 14, at the point of time t2, the PCS ECU 10 calculates the second index value dgt. Then, as described above, the PCS ECU 10 sets the area Sa ahead of the own vehicle SV by applying the second index value dgt to the map MP(dgt). This area Sa corresponds to the area Sa' shown in FIG. 12. The PCS ECU 10 determines that the position Pi of the first other vehicle OV1 is in the area Sa.

<Point of Time t3>

As shown in FIG. 15, at the point of time t3, the PCS ECU 10 calculates the second index value dgt. Then, as described above, the PCS ECU 10 sets the area Sa ahead of the own vehicle SV by applying the second index value dgt to the map MP(dgt). This area Sa corresponds to the area Sa" shown in FIG. 12. The PCS ECU 10 determines that the position Pi of the first other vehicle OV1 is in the area Sa. At the point of time t3, the predetermined second time threshold Tmth elapses since the point of time t1. Thus, the position Pi of the first other vehicle OV1 continues to be in the area Sa for the predetermined second time threshold Tmth or more. Thus, the PCS ECU 10 determines that the first other vehicle OV1 satisfies the control target condition. Then, the PCS ECU 10 selects, as the control target vehicle, the first other vehicle OV1 which is the control target candidate vehicle.

When the PCS execution condition becomes satisfied after the point of time t3, that is, the first index value Tc becomes equal to or smaller than the predetermined first time threshold Tcth, the PCS ECU 10 executes the PCS control. Thereby, the PCS ECU 10 can select, as the control target vehicle, the first other vehicle OV1 which has a high probability of colliding with the own vehicle SV.

Figure 16:
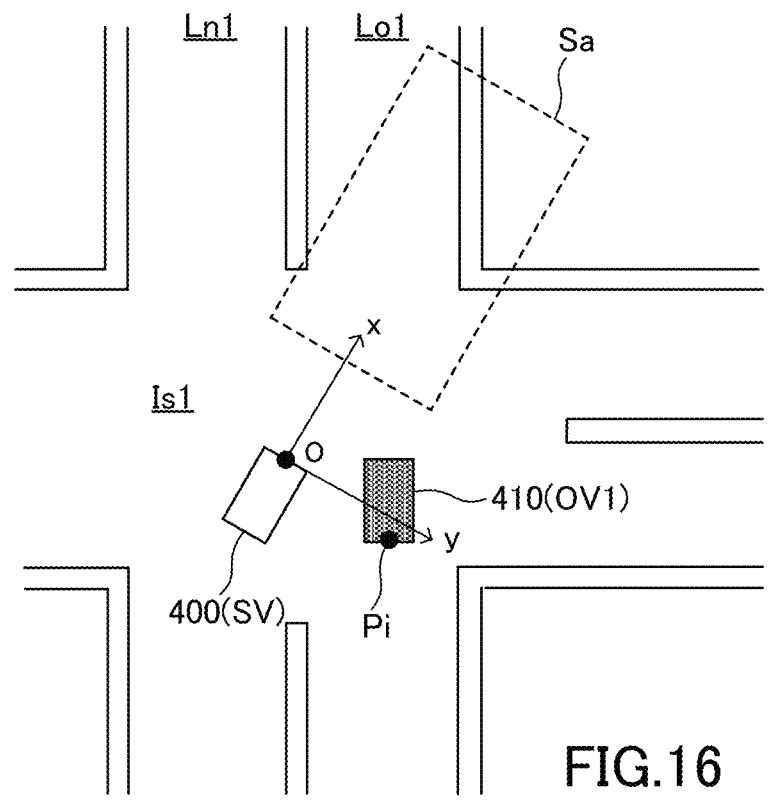
FIG. 16 is a view which shows a situation that the oncoming vehicle passes the traffic intersection earlier than the own vehicle.

On the other hand, in the situation (1) described above, as shown in FIG. 16, the position Pi of the first other vehicle OV1 is outside of the area Sa after a certain point of time. That is, the position Pi of the first other vehicle OV1 may not continue to be in the area Sa for the predetermined second time threshold Tmth or more.

Figure 17:
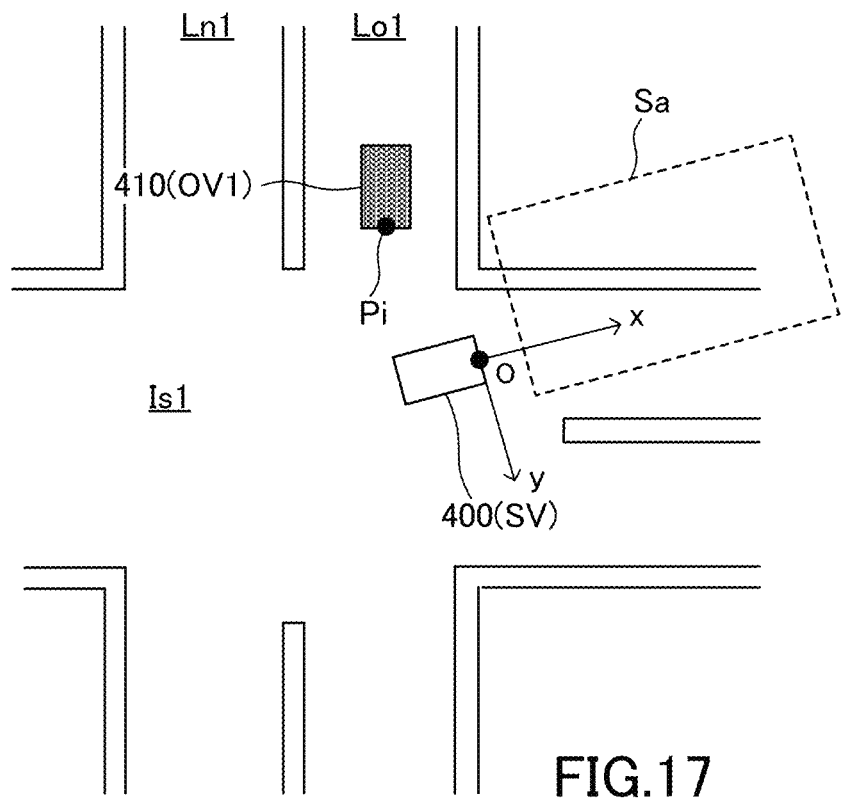
FIG. 17 is a view which shows a situation that the own vehicle passes the traffic intersection earlier than the oncoming vehicle.

Also, in the situation (2) described above, as shown in FIG. 17, the position Pi of the first other vehicle OV1 is outside of the area Sa after a certain point of time. That is, the position Pi of the first other vehicle OV1 may not continue to be in the area Sa for the predetermined second time threshold Tmth or more. Thus, in the situations (1) and (2), the control target condition is unlikely to become satisfied. In this case, the PCS ECU 10 does not select the first other vehicle OV1 as the control target vehicle. Thus, the PCS control can be prevented from being executed in the situation that the PCS control should not be executed.

<Operations>

As described above, the CPU 101 of the PCS ECU 10 (hereinafter, the CPU 101 will be simply referred to as "CPU") determines, based on (i) the activated state of the right turn signal lamps and (ii) the moving state information, whether the own vehicle SV starts turning right. The CPU executes routines shown in FIG. 18 to FIG. 20 each time a predetermined time dT elapses after the CPU determines that the own vehicle SV starts turning right.

Each time the predetermined time dT elapses, the CPU acquires the moving state information from the sensors 11 to 14, acquires the vehicle surrounding information from the surrounding sensors 15, and stores the acquired information in the RAM 103.

It should be noted that the CPU sets values of various flags (i.e., a first flag X1 and a second flag X2 described later) to "0" and sets a variable (i.e., a duration time variable Tm described later) to zero in an initializing routine. The initializing routine is executed when an ignition switch (not shown) is operated from an OFF state to an ON state.

Figure 18:
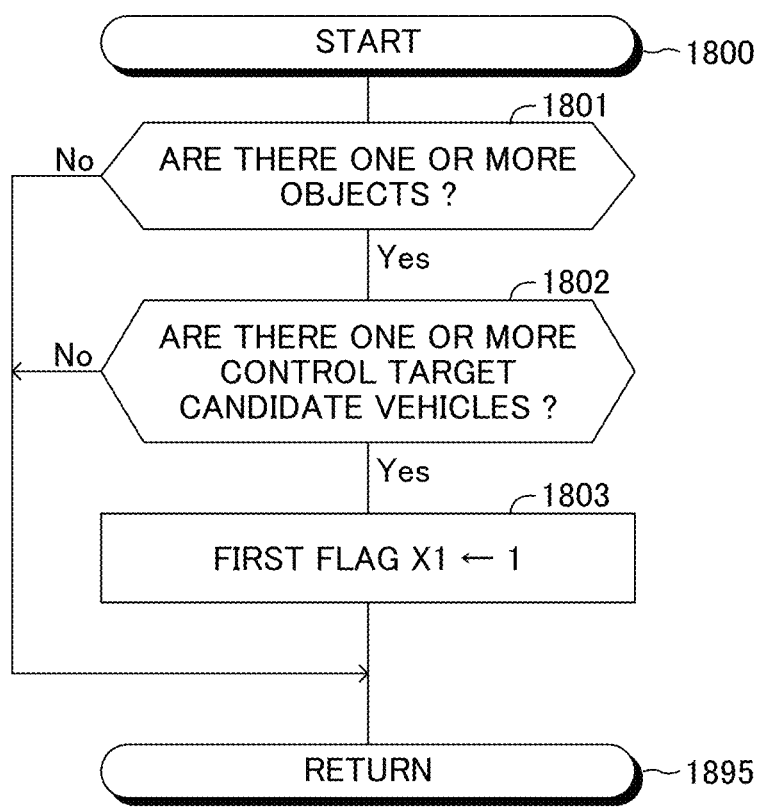
FIG. 18 is a view which shows a flowchart of a first flag setting routine executed by a CPU of a collision avoiding ECU.

At a predetermined timing, the CPU starts a process from a step 1800 of the routine shown in FIG. 18 and proceeds with the process to a step 1801 to determine, based on the object information, whether there are one or more objects in the surrounding area around the own vehicle SV. When there is no object in the surrounding area around the own vehicle SV, the CPU determines "No" at the step 1801 and proceeds with the process directly to a step 1895 to terminate the process of this routine once.

On the other hand, when there are one or more objects in the surrounding area around the own vehicle SV, the CPU determines "Yes" at the step 1801 and proceeds with the process to a step 1802. As the step 1802, the CPU determines whether there is one or more control target candidate vehicles among the objects recognized at the step 1801. In particular, as shown in FIG. 4, the CPU calculates the first predicted route tr1 of the own vehicle SV and the second predicted routes tr2 of the objects recognized at the step 1801. The CPU selects, as the control target candidate vehicles, the objects having the second predicted routes tr2 which cross the first predicted route tr1. In this case, the CPU determines "Yes" at the step 1802 and proceeds with the process to a step 1803 to sets the value of a first flag X1 to "1". When the value of the first flag X1 is "0", the first flag X1 represents that there is no control target candidate vehicle. On the other hand, when the value of the first flag X1 is "1", the first flag X1 represents that there is at least one control target candidate vehicle. Then, the CPU proceeds with the process to the step 1895 to terminate the process of this routine once.

It should be noted that when there is no control target candidate vehicle, the CPU determines "No" at the step 1802 and proceeds with the process directly to the step 1895 to terminate the process of this routine once.

Figure 19:
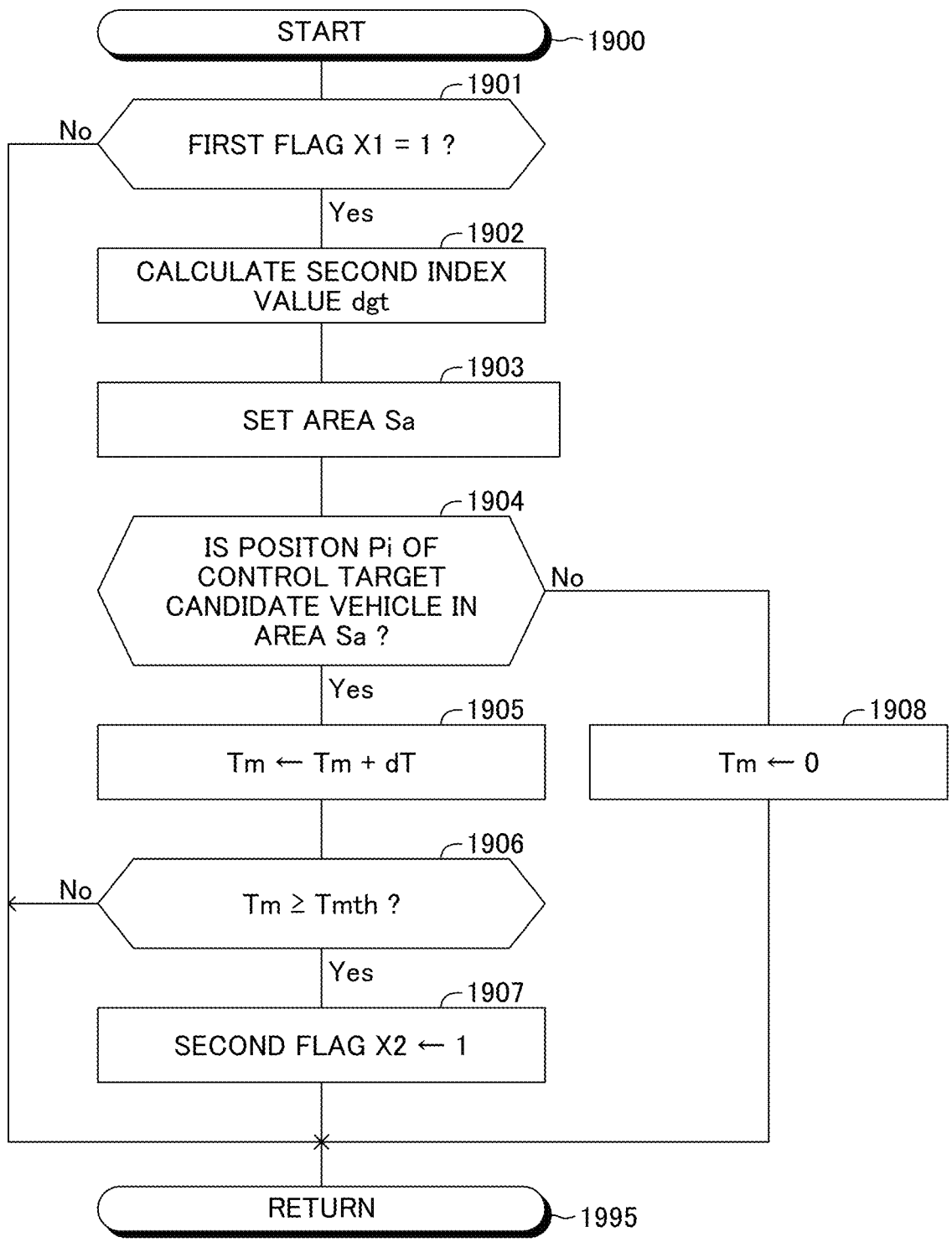
FIG. 19 is a view which shows a flowchart of a second flag setting routine executed by the CPU of the collision avoiding ECU.

Further, at a predetermined timing, the CPU executes the routine shown in FIG. 19. It should be noted that when the CPU determines that there are the control target candidate vehicles in the routine shown in FIG. 18, the CPU executes the routine shown in FIG. 19 for each control target candidate vehicle.

The CPU starts a process from a step 1900 of the routine shown in FIG. 19 and proceeds with the process to a step 1901 to determine whether the value of the first flag X1 is "1". When the value of the first flag X1 is not "1", the CPU determines "No" at the step 1901 and proceeds with the process directly to a step 1995 to terminate the process of this routine once.

When there is at least one control target candidate vehicle, and the value of the first flag X1 is "1", the CPU determines "Yes" at the step 1901 and sequentially executes processes of steps 1902 and 1903 described below. Then, the CPU proceeds with the process to a step 1904.

Step 1902: The CPU calculates the second index value dgt as described above.

Step 1903: The CPU acquires the x-coordinates and y-coordinates of the four vertexes v1 to v4 which define the area Sa by applying the second index value dgt to the map MP(dgt). Then, the CPU sets the area Sa ahead of the own vehicle SV.

Then, at a step 1904, the CPU acquires the position Pi of the control target candidate vehicle or the oncoming vehicle. Then, the CPU determines whether the position Pi of the control target candidate vehicle is in the area Sa. When the position Pi of the control target candidate is not in the area Sa, the CPU determines "No" at the step 1904 and proceeds with the process to a step 1908 to set the duration time variable Tm to zero. The time variable Tm represents the duration time that the position Pi of the control target candidate vehicle continues to be in the area Sa.

On the other hand, when the position Pi of the control target candidate vehicle is in the area Sa, the CPU determines "Yes" at the step 1904 and proceeds with the process to a step 1905 to increase the time variable Tm by the predetermined time dT. As described above, the predetermined time dT corresponds to a cycle of executing the routine shown in FIG. 9.

Then, at a step 1906, the CPU determines whether the time variable Tm is greater than or equal to the predetermined second time threshold Tmth. When the time variable Tm is not greater than or equal to the predetermined second time threshold Tmth, the CPU determines "No" at the step 1906 and proceeds with the process directly to the step 1995 to terminate the process of this routine once.

On the other hand, when the time variable Tm is greater than or equal to the predetermined second time threshold Tmth, the CPU determines "Yes" at the step 1906 and proceeds with the process to a step 1907 to set the value of the second flag X2 to "1". When the value of the second flag X2 is "0", the second flag X2 represents that there is no control target vehicle. On the other hand, when the value of the second flag X2 is "1", the second flag X2 represents that there is at least one control target vehicle. Then, the CPU proceeds with the process to the step 1995 to terminate the process of this routine once.

Figure 20:
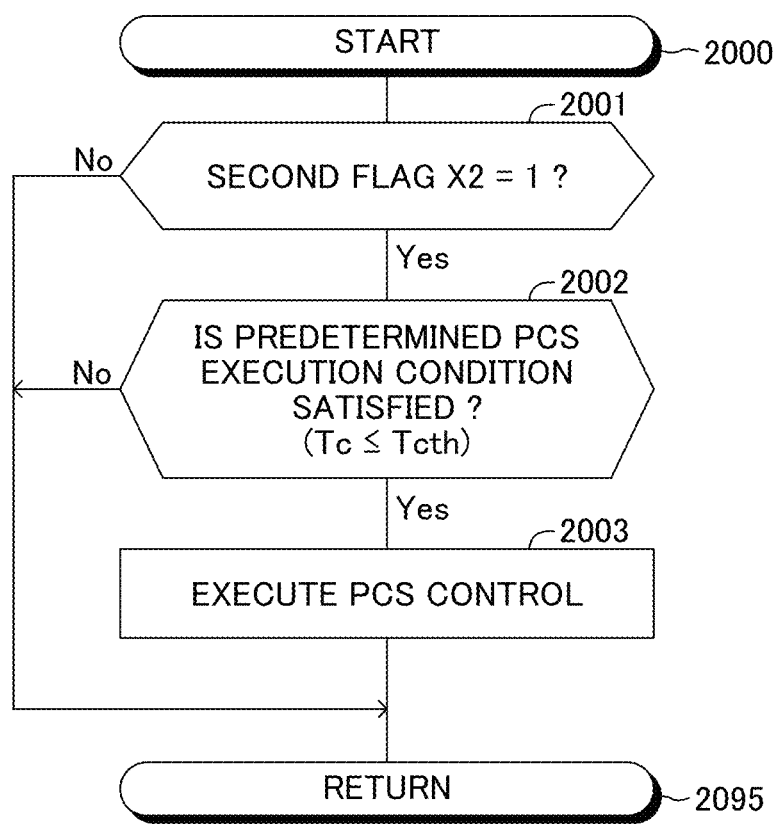
FIG. 20 is a view which shows a flowchart of a collision avoiding control executing routine executed by the CPU of the collision avoiding ECU.

Further, at a predetermined timing, the CPU starts a process from a step 2000 of the routine shown in FIG. 20 and proceeds with the process to a step 2001 to determine whether the value of the second flag X2 is "1". When the value of the second flag X2 is not "1", the CPU determines "No" at the step 2001 and proceeds with the process directly to a step 2095 to terminate the process of this routine once.

When there is at least one control target vehicle, and the value of the second flag X2 is "1", the CPU determines "Yes" at the step 2001 and proceeds with the process to a step 2002 to determine whether the predetermined PCS execution condition is satisfied. In particular, the CPU determines whether the first index value Tc is smaller than or equal to the predetermined first time threshold Tcth. When the predetermined PCS execution condition is not satisfied, the CPU determines "No" at the step 2002 and proceeds with the process directly to the step 2095 to terminate the process of this routine once.

On the other hand, when the predetermined PCS execution condition is satisfied, the CPU determines "Yes" at the step 2002 and proceeds with the process to a step 2003 to execute the PCS control. Then, the CPU proceeds with the process to the step 2095 to terminate the process of this routine once.

The first apparatus configured as described above selects the control target vehicle, using the area Sa. The area Sa is set, based on change of the positional relationship between the own vehicle SV and the oncoming vehicle which has a high probability of colliding with the own vehicle SV. When the control target candidate vehicle continues to be in the area Sa for the predetermined second time threshold Tmth or more, the own vehicle SV has a high probability of colliding with the control target candidate vehicle in question. In this case, the first apparatus selects the control target candidate vehicle in question as the control target vehicle. Thus, the first apparatus executes the PCS control in an appropriate situation that the own vehicle SV has a high probability of colliding with the oncoming vehicle. On the other hand, in the situations (1) and (2) described above, the first apparatus does not select the oncoming vehicle as the control target vehicle. Thus, the PCS control can be prevented from being executed in a situation that the PCS control should not be executed.

Second Embodiment

Next, the vehicle control apparatus according to a second embodiment (hereinafter, this vehicle control apparatus will be also referred to as "second apparatus") will be described. The second apparatus is different from the first apparatus in that the second apparatus changes a size of the area Sa. Below, the difference of the second apparatus from the first apparatus will be mainly described.

Figure 21:
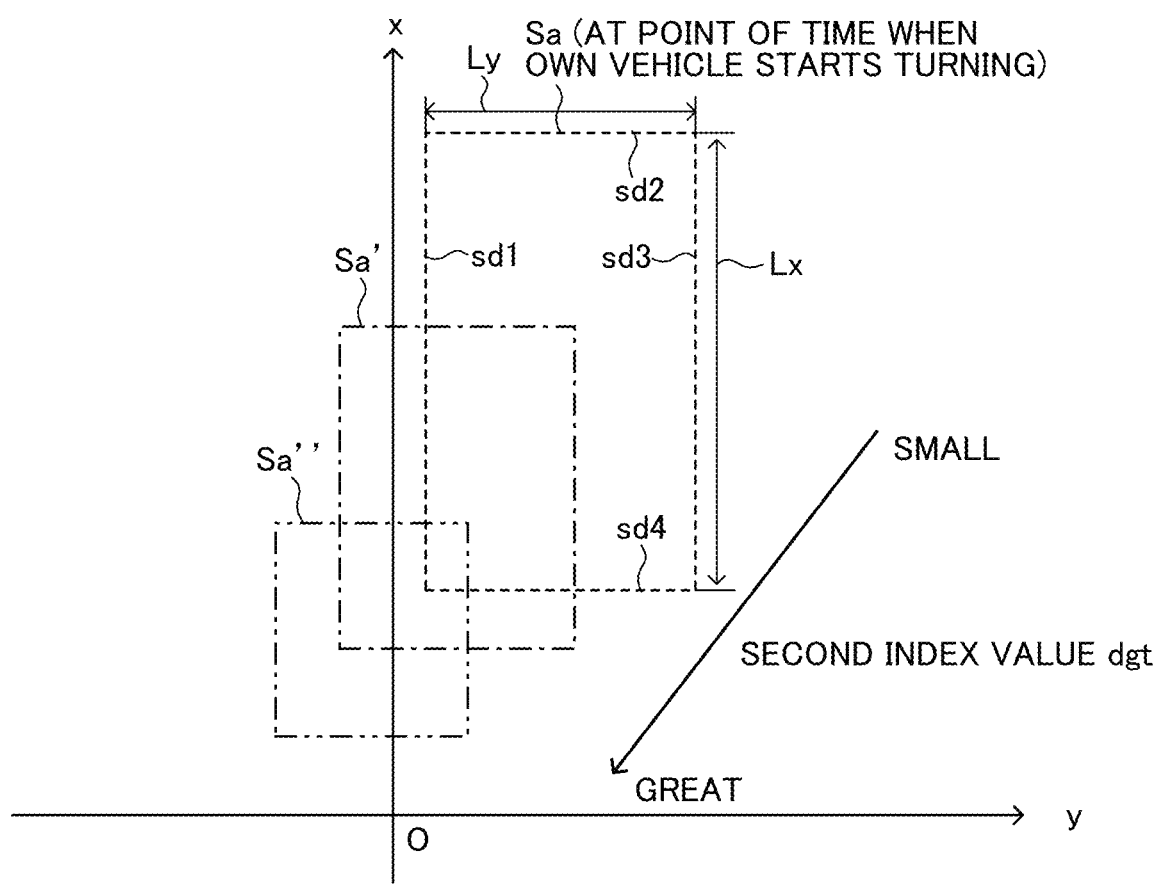
FIG. 21 is a view which shows change of the area Sa on the two-dimension coordinate system according to a second embodiment of the invention.
Figure 22:
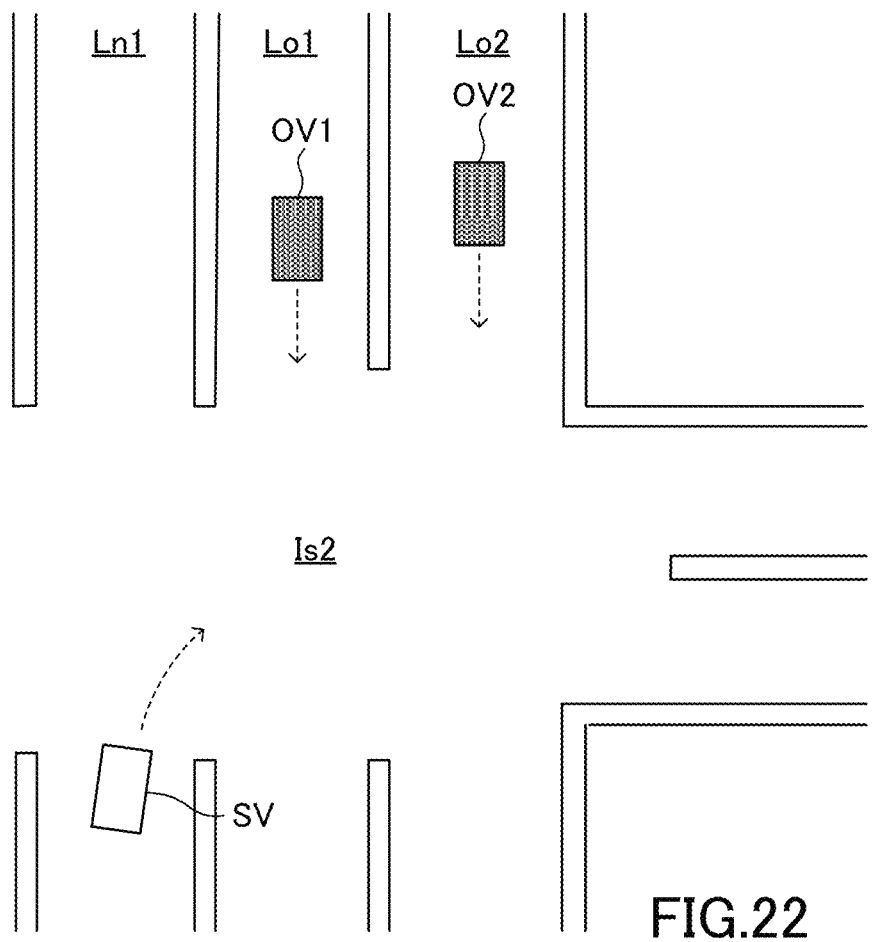
FIG. 22 is a view which shows a situation that the own vehicle is turning right, and there are two oncoming vehicles.

As shown in FIG. 21, the PCS ECU 10 of the second apparatus decreases or reduces the size of the area Sa as the second index value dgt increases. In particular, as the second index value dgt increases, the length Lx of the area Sa in the x-axis direction is decreased or reduced, and the length Ly of the area Sa in the y-axis direction is decreased or reduced (see the area Sa' and the area Sa").

In addition, while the PCS ECU 10 decreases or reduces the size of the area Sa, the PCS ECU 10 moves the area Sa toward the own vehicle SV in the opposite direction to the turning direction of the own vehicle SV. That is, the PCS ECU 10 moves the area Sa toward the own vehicle SV in the left direction, i.e., the opposite direction to the turning direction, i.e., the right direction of the own vehicle SV. Thus, the size of the area Sa is decreased or reduced, the position of the second side sd2 and the position of the fourth side sd4 move toward the own vehicle SV or move in a negative direction of the x-axis, and the position of the first side sd1 and the position of the third side sd3 move in the opposite direction to the turning direction of the own vehicle SV or move in a negative direction of the y-axis.

As shown in FIG. 8, as the second index value dgt increases since the point of time t1 when the own vehicle SV starts turning, the value of the x-coordinate xi of the position Pi of the first other vehicle OV1 decreases. That is, the first other vehicle OV1 gradually approaches the own vehicle SV. If the length Lx of the area Sa in the x-axis direction is relatively great at a point of time when the second index value dgt increases to a great value, the other oncoming vehicle relatively remote from the own vehicle SV, that is, the other vehicle which has a low probability of colliding with the own vehicle SV may be in the area Sa. Thus, the PCS ECU 10 sets the area Sa such that the length Lx of the area Sa in the x-axis direction is decreased as the second index value dgt increases.

Further, if the length Ly of the area Sa in the y-axis direction is relatively great at a point of time when the second index value dgt increases to a great value, the other oncoming vehicle which turns, for example, right ahead of the own vehicle SV may be in the area Sa. Thus, the PCS ECU 10 sets the area Sa such that the length Ly of the area Sa in the y-axis direction is decreased as the second index value dgt increases.

<Examples of Operations>

Processes of selecting the control target vehicle will be described with respect to FIG. 22 to FIG. 25. In an example shown in FIG. 22, the own vehicle SV moves in the first moving lane Ln1 and is turning right in the traffic intersection Is2. Further, the first other vehicle OV1 moves in the first oncoming lane Lo1. The first oncoming lane Lo1 is an oncoming lane for the first moving lane Ln1. In this example, the first oncoming lane Lo1 is a right-turn-only lane. Further, the second other vehicle OV2 moves in a second oncoming lane Lo2. The second oncoming lane Lo2 is an oncoming lane for the first moving lane Ln1.

<Point of Time t11>

Figure 23:
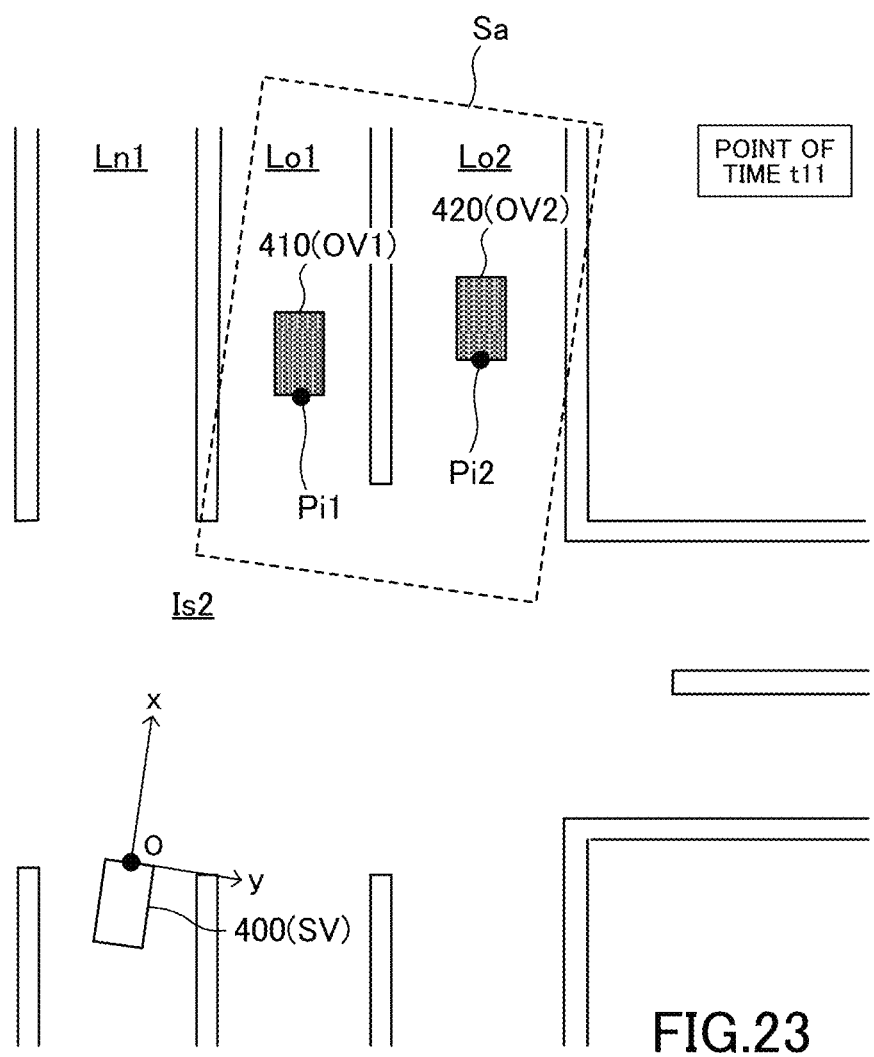
FIG. 23 is a view which describes a flow of processes of selecting the oncoming vehicle as the control target vehicle.

As shown in FIG. 23, the own vehicle SV starts turning right at a point of time t11. The PCS ECU 10 draws the first rectangle 400 which represents the own vehicle SV, the second rectangle 410 which represents the first other vehicle OV1, and a third rectangle 420 which represents the second other vehicle OV2. The own vehicle SV has a probability of colliding with the first other vehicle OV1 and the second other vehicle OV2. Thus, the PCS ECU 10 selects the first other vehicle OV1 and the second other vehicle OV2 as the control target candidate vehicles.

Then, the PCS ECU 10 calculates the second index value dgt. Then, the PCS ECU 10 acquires the x-coordinates and the y-coordinates of the four vertexes v1 to v4 which define the area Sa by applying the second index value dgt to the predetermined map MP(dgt). Then, the PCS ECU 10 sets the area Sa ahead of the own vehicle SV. The area Sa corresponds to the area Sa shown in FIG. 21. The length Lx of the area Sa in the x-axis direction and the length Ly of the area Sa in the y-axis direction are used at a point of time when the own vehicle SV starts turning. The length Lx and the length Ly are set to relatively great values, respectively. In particular, the length Lx in the x-axis direction and the length Ly in the y-axis direction are set to cover the first oncoming lane Lo1 and the second oncoming lane Lo2. Thus, the PCS ECU 10 can be likely to select, as the control target vehicle, the oncoming vehicle, i.e., the second other vehicle OV2 which moves relatively remote from the own vehicle SV.

Hereinafter, the center position of the second rectangle 410 on the two dimension coordinate system will be referred to as "position Pi1 of the first other vehicle OV1", and the center position of the third rectangle 420 will be referred to as "position Pi2 of the second other vehicle OV2". The position Pi1 of the first other vehicle OV1 corresponds to the center position of the front portion of the first other vehicle OV1 in the width direction of the first other vehicle OV1. The position Pi2 of the second other vehicle OV2 corresponds to a center position of a front portion of the second other vehicle OV2 in the width direction of the second other vehicle OV2. At the point of time t11, the PCS ECU 10 determines that the position Pi1 of the first other vehicle OV1 and the position Pi2 of the second other vehicle OV2 are in the area Sa.

<Point of Time t12>

Figure 24:
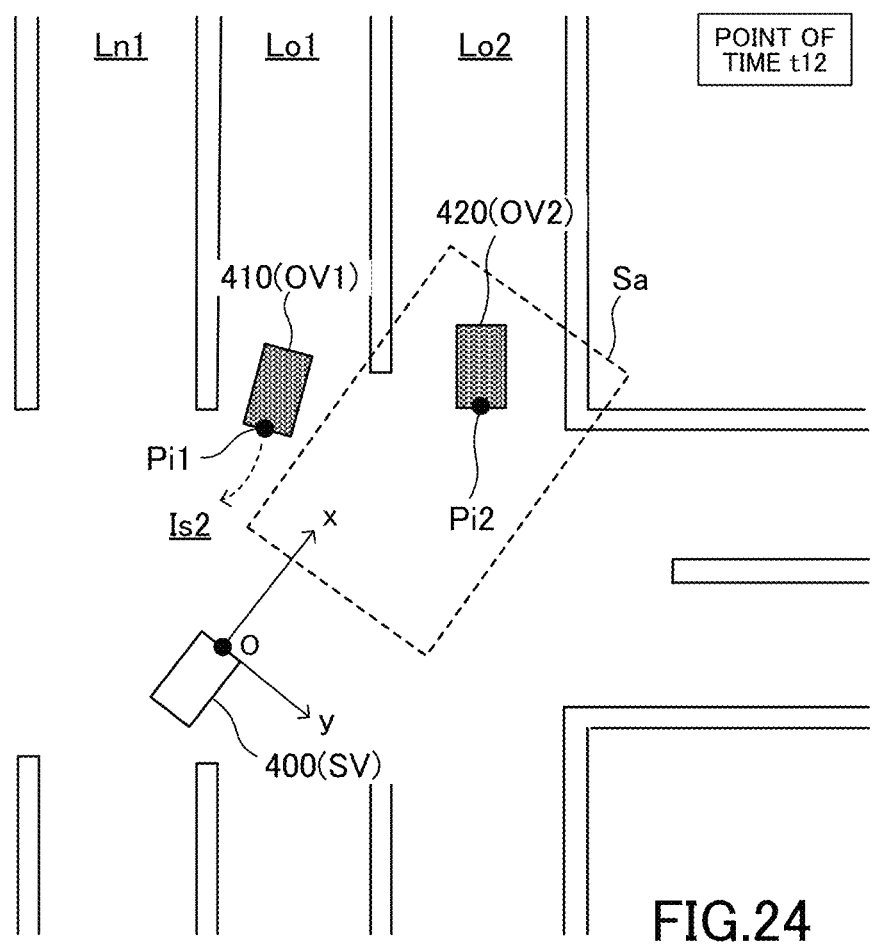
FIG. 24 is a view which describes the flow of the processes of selecting the oncoming vehicle as the control target vehicle.

As shown in FIG. 24, at a point of time t12 after the point of time t11, the own vehicle SV has entered in the traffic intersection Is2. At the point of time t12, the degree of right turning of the own vehicle SV is greater than the degree of right turning of the own vehicle SV at the point of time t11. Thus, the second index value dgt at the point of time t12 is greater than the second index value dgt at the point of time t11. In addition, at the point of time t12, the first other vehicle OV1 has started turning right.

As described above, the PCS ECU 10 sets the area Sa ahead of the own vehicle SV by applying the second index value dgt to the map MP(dgt). This area Sa shown in FIG. 24 corresponds to the area Sa' shown in FIG. 21. At the point of time t12, the length Lx of the area Sa in the x-axis direction and the length Ly of the area Sa in the y-axis direction are shorter than the length Lx of the area Sa in the x-axis direction and the length Ly of the area Sa in the y-axis direction at the point of time t11. Thereby, the position Pi1 of the first other vehicle OV1 which turns right ahead of the own vehicle SV is not in the area Sa. Thus, the PCS ECU 10 determines that the position Pi1 of the first other vehicle OV1 is not in the area Sa. On the other hand, the PCS ECU 10 determines that the position Pi2 of the second other vehicle OV2 is in the area Sa.

<Point of Time t13>

Figure 25:
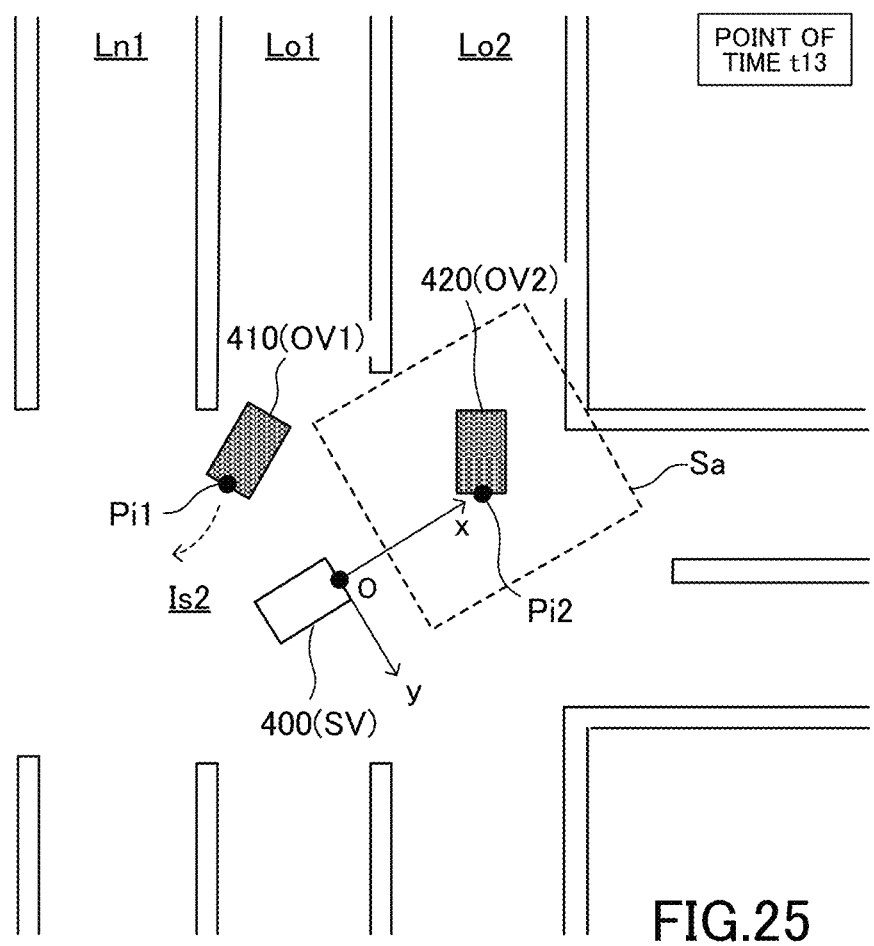
FIG. 25 is a view which describes the flow of the processes of selecting the oncoming vehicle as the control target vehicle.

As shown in FIG. 25, at a point of time t13 after the point of time t12, the second other vehicle OV2 has entered in the traffic intersection Is2. Further, at the point of time t13, the degree of right turning of the own vehicle SV is greater than the degree of right turning of the own vehicle SV at the point of time t12. Thus, the second index value dgt of the own vehicle SV at the point of time t13 is greater than the second index value dgt of the own vehicle SV at the point of time t12.

As described above, the PCS ECU 10 sets the area Sa ahead of the own vehicle SV by applying the second index value dgt to the map MP(dgt). This area Sa shown in FIG. 25 corresponds to the area Sa" shown in FIG. 21. At the point of time t13, the length Lx of the area Sa in the x-axis direction and the length Ly of the area Sa in the y-axis direction are shorter than the length Lx of the area Sa in the x-axis direction and the length Ly of the area Sa in the y-axis direction at the point of time t12. In this case, the PCS ECU 10 determines that the position Pi1 of the first other vehicle OV1 is not in the area Sa. On the other hand, the PCS ECU 10 determines that the position Pi2 of the second other vehicle OV2 is in the area Sa. In addition, the predetermined second time threshold Tmth elapses since the point of time t11. Thus, the position Pi2 of the second other vehicle OV2 continues to be in the area Sa for the predetermined second time threshold Tmth or more. Thus, the PCS ECU 10 determines that the second other vehicle OV2 satisfies the control target condition. Thus, the PCS ECU 10 selects the second other vehicle OV2 as the control target vehicle.

The second apparatus configured as described above sets the length Lx of the area Sa in the x-axis direction and the length Ly of the area Sa in the y-axis direction to relatively great values, respectively at a point of time when the own vehicle SV starts turning. Thereby, even when the oncoming lanes (the first oncoming lane Lo1 and the second oncoming lane Lo2) are provided on the road, the oncoming vehicle relatively remote from the own vehicle SV, for example, the second other vehicle OV2 at the point of time t11 is likely to be selected as the control target vehicle.

In addition, the second apparatus sets the area Sa with decreasing or reducing the length Lx of the area Sa in the x-axis direction and the length Ly of the area Sa in the y-axis direction as the second index value dgt increases. Thus, the oncoming vehicle relatively remote from the own vehicle SV is unlikely to be in the area Sa. In addition, the oncoming vehicle turning ahead of the own vehicle SV is unlikely to be in the area Sa. Thus, the PCS control is unlikely to be executed in the situation that the PCS control should not be executed.

As another example, the second apparatus may set the area Sa with decreasing or reducing one of the length Lx of the area Sa in the x-axis direction and the length Ly of the area Sa in the y-axis direction as the second index value dgt increases. Also in this case, the PCS control is unlikely to be executed in the situation that the PCS control should not be executed.

It should be noted that the invention is not limited to the aforementioned embodiments, and various modifications can be employed within the scope of the invention.

Modified Example 1

The CPU may be configured to change the predetermined second time threshold Tmth, depending on the moving speed Vs of the own vehicle SV at the step 1906 of the routine shown in FIG. 19. When the moving speed Vs of the own vehicle SV is high, time taken for the own vehicle SV to reach the crossing position Ps is short. Thus, the CPU may be configured to set the predetermined second time threshold Tmth such that the predetermined second time threshold Tmth is decreased as the moving speed Vs of the own vehicle SV increases. Thereby, the CPU can select the control target vehicle at an earlier timing and execute the PCS control at an appropriate timing when the moving speed Vs of the own vehicle SV is high.

According to further another example, the CPU may be configured to set the predetermined second time threshold Tmth to a first value T1 when the moving speed Vs of the own vehicle SV is equal to or smaller than a predetermined speed threshold Vsth. In this case, the CPU may be configured to set the predetermined second time threshold Tmth to a second value T2 when the moving speed Vs of the own vehicle SV is greater than the predetermined speed threshold Tsth.

Modified Example 2

The CPU may be configured to acquire the road information from the map storing section 52 and change the size and the position of the area Sa, based on the acquired road information. In this case, for example, the CPU determines whether a particular lane condition is satisfied. The particular lane condition is satisfied when the road on which the oncoming vehicle moves includes a turn-only lane. That is, the particular lane condition is satisfied when the oncoming lanes of the road on which the oncoming vehicle moves includes the turn-only lane. The turn-only lane includes a right-turn-only lane and a left-turn-only lane. When the particular lane condition is satisfied, the CPU sets the area Sa such that the area Sa does not cover the turn-only lane.

Figure 26:
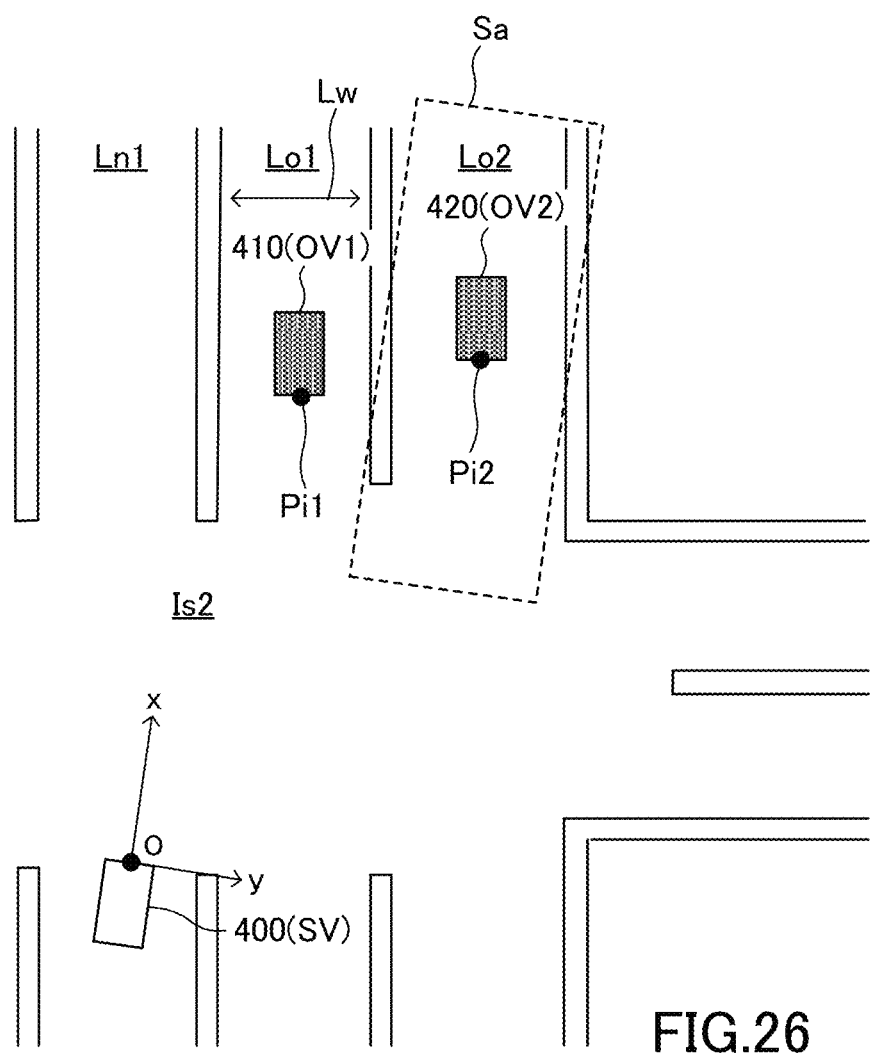
FIG. 26 is a view which describes processes of setting the area Sa according to a modified example of the embodiments of the invention.

FIG. 26 shows the same situation as the situation shown in FIG. 23. The first oncoming lane Lo1 is the right-turn-only lane. The CPU may be configured to decrease or reduce the area Sa by decreasing or reducing the length Ly of the area Sa in the y-axis direction by a width Lw of the first oncoming lane Lo1 at the point of time t11 when the own vehicle SV starts turning. It should be noted that the CPU can acquire information on the width Lw of the first oncoming lane Lo1, based on the road information. Thereby, the first other vehicle OV1 turning right ahead of the own vehicle SV is unlikely to be in the area Sa.

According to further another example, the CPU may be configured to move the area Sa by the width Lw of the first oncoming lane Lo1 in the positive y-axis direction at the point of time t11 when the own vehicle SV starts turning. Thereby, the first other vehicle OV1 turning right ahead of the own vehicle SV is unlikely to be in the area Sa.

Modified Example 3

The second index value dgt is not limited to ones described above. The second index value dgt may be any value as far as the second index value dgt represents the degree of turning of the own vehicle SV since the turn start point of time. The second index value dgt may be an angle θ which is defined by a predetermined reference axis and the moving direction of the own vehicle SV. The predetermined reference axis is, for example, the moving direction of the own vehicle SV at the turn start point of time. According to another example, the predetermined reference axis may be a direction in which the first moving lane Ln1 in which the own vehicle SV moves extends. The CPU can acquire the direction in which the first moving lane Ln1 extends, based on the lane information.

According to further another example, the second index value dgt may be an integration value of a particular angle θa since the turn start point of time. The particular angle θa is an angle which is defined by a speed vector at a point of time t and the speed vector at a point of time t+Δt. The particular angle θa takes a positive value when the own vehicle SV turns right.

According to further another example, the second index value dgt may be a magnitude of a change amount of the steering angle θ since the turn start point of time. Further, the second index value dgt may be a moving distance of the own vehicle SV since the turn start point of time.

Modified Example 4

At the step 1904 of the routine shown in FIG. 19, the CPU executes a process of determining whether the position Pi of the control target candidate vehicle is in the area Sa. However, the process of the step 1904 is not limited to this process. The CPU may be configured to determine whether at least a part of the rectangle which represents the control target candidate vehicle is in the area Sa. For example, the CPU may be configured to determine whether at least a part of the second rectangle 410 which represents the first other vehicle OV1 is in the area Sa.

Modified Example 5

The step 1802 of the routine shown in FIG. 18 may be omitted. In this case, the CPU executes the routine shown in FIG. 19 for each object recognized at the step 1801. The CPU may be configured to select, as the control target vehicle, the object having the position Pi which continues to be in the area Sa for the predetermined second time threshold Tmth or more.

Modified Example 6

The shape of the area Sa may be any shape other than a quadrangle. The shape of the area Sa may be a triangle or a polygon other than the quadrangle. Further, the shape of the area Sa may be a round shape such as a circle and an oval. When the shape of the area Sa is the round shape, the CPU of the first apparatus moves a center of the round shape toward the own vehicle SV in the opposite direction (the left direction) to the turning direction (the right direction) of the own vehicle SV with maintaining a diameter of the round shape as the second index value dgt increases. When the shape of the area Sa is the round shape, the CPU of the second apparatus may change the diameter of the round shape such that an area of the area Sa is decreased as the second index value dgt increases.

Modified Example 7

The CPU may be configured to determine whether the own vehicle SV starts turning right, based on information from the navigation ECU 50. For example, the CPU may be configured to start executing the routines shown in FIG. 18 to FIG. 20 when the CPU determines, based on the information from the navigation ECU 50, that the own vehicle SV approaches the traffic intersection, or the own vehicle SV moves in the right-turn-only lane.

Modified Example 8

The CPU may be configured to estimate the position of the own vehicle SV in the traffic intersection by communication means such as vehicle to vehicle communication (V2V: Vehicle to Vehicle) or vehicle to infrastructure communication (V2I: Vehicle to Infrastructure). In this case, the CPU may be configured to estimate the second index value dgt, based on the position of the own vehicle SV in the traffic intersection. At a point of time when the own vehicle SV has entered in the traffic intersection Is1 as in the example shown in FIG. 6, the CPU estimates that the second index value dgt is a relatively small value. Then, at a point of time when the own vehicle SV has entered in the first oncoming lane Lo1 as in the example shown in FIG. 7, the CPU estimates that the second index value dgt is a relatively great value.

Modified Example 9

The first index value which represents a collision probability that the own vehicle SV collides with the control target vehicle, is not limited to ones of the examples described above. The first index value may be a distance ds. For example, the predetermined PCS execution condition may be a condition that the distance ds is equal to or shorter than a predetermined distance threshold dsth.

Modified Example 10

The embodiments described above are examples applied to countries and regions where the vehicles move to the left side of the road. However, the embodiments described above can be applied to countries and regions where the vehicles move to the right side of the road. In this case, the PCS ECU 10 executes the routines shown in FIG. 18 to FIG. 20 after the PCS ECU 10 determines that the own vehicle SV starts turning left. In this case, the PCS ECU 10 moves the area Sa toward the own vehicle SV in the opposite direction (the right direction or the positive direction of the y-axis) to the turning direction (the left direction or the negative direction of the y-axis) of the own vehicle SV as the second index value dgt increases.

What is claimed is:

1. A vehicle control apparatus, comprising:
    at least one sensor which acquires object information on objects in a surrounding area around an own vehicle, including a forward area ahead of the own vehicle; and
    a processor configured to:
        select at least one oncoming vehicle which is in the forward area and moves toward the own vehicle and set the selected at least one oncoming vehicle as a control target vehicle when the own vehicle turns right or left in a traffic intersection;
        acquire a first index value which represents a collision probability that the own vehicle collides with the control target vehicle; and
        execute a collision avoiding control of avoiding collision of the own vehicle with the control target vehicle when the first index value satisfies a predetermined condition,
    wherein the processor is further configured to:
        calculate a second index value which represents a degree of turning of the own vehicle since the own vehicle starts turning right or left in the traffic intersection;
        move an area used to select the control target vehicle toward the own vehicle in an opposite direction to a turning direction of the own vehicle as the second index value increases; and
        select, as the control target vehicle, the oncoming vehicle which has been in the area for a predetermined time threshold or more.

2. The vehicle control apparatus as set forth in claim 1, wherein:
    the processor is further configured to move a center position of the area from a first position to a second position;
    the first position is a position which is ahead of the own vehicle and remote from a longitudinal axis of the own vehicle in the turning direction of the own vehicle; and
    the second position is a position which is ahead of the own vehicle and remote from the longitudinal axis of the own vehicle in an opposite direction to the turning direction of the own vehicle.

3. The vehicle control apparatus as set forth in claim 1, wherein the processor is further configured to decrease a size of the area as the second index value increases.

4. The vehicle control apparatus as set forth in claim 3, wherein the processor is further configured to decrease a length of the area in a longitudinal direction of the own vehicle and a length of the area in a right-left direction of the own vehicle.

5. The vehicle control apparatus as set forth in claim 1, wherein the processor is further configured to decrease the predetermined time threshold as a moving speed of the own vehicle increases.

6. The vehicle control apparatus as set forth in claim 1, wherein:
    the vehicle control apparatus comprises a storing section which stores road information; and
    the processor is further configured to:
        determine whether a particular lane condition that at least one turn-only lane is provided on a road on which the oncoming vehicle moves, is satisfied, based on the road information; and
        set the area such that the area does not cover the turn-only lane when the particular lane condition is satisfied.

* * * * *